United States Patent
Acharya

(10) Patent No.: US 10,297,003 B2
(45) Date of Patent: May 21, 2019

(54) EFFICIENT SAVING AND RESTORING OF CONTEXT INFORMATION FOR CONTEXT SWITCHES

(71) Applicant: QUALCOMM Incorporated, San Diego, CA (US)

(72) Inventor: Anirudh Rajendra Acharya, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 14/859,861

(22) Filed: Sep. 21, 2015

(65) Prior Publication Data

US 2017/0083998 A1   Mar. 23, 2017

(51) Int. Cl.
*G06T 1/60* (2006.01)
*G06T 1/20* (2006.01)
*G06F 9/46* (2006.01)

(52) U.S. Cl.
CPC .............. *G06T 1/60* (2013.01); *G06F 9/461* (2013.01); *G06T 1/20* (2013.01)

(58) Field of Classification Search
CPC .......... G06T 1/20; G06T 15/005; G06T 1/60; G06T 15/80; G06T 2210/32; G06T 15/08; G06T 15/405; G06T 2210/52; G06T 17/20; G06F 12/109; G06F 9/48; G06F 12/0284; G06F 12/10; G06F 9/45558; G06F 12/0875; G06F 12/1009; G06F 2212/452; G06F 2009/45583; G06F 13/1673; G06F 12/0842; G06F 2212/682; G06F 3/061; G06F 21/64; G06F 11/0709; G06F 8/20; G06F 21/566; G06F 17/30109; G06F 15/78;
(Continued)

(56) References Cited

U.S. PATENT DOCUMENTS 6,219,779 B1    4/2001   Takayama et al.
8,643,659 B1 *  2/2014   Baldwin ................... G06T 1/60
                                                     345/557
(Continued)

OTHER PUBLICATIONS

Sanchez, et al., "Design and Implementation of Signatures for Transactional Memory Systems," Department of Computer Sciences, Aug. 2007, 72 pp.
(Continued)

*Primary Examiner* — Xilin Guo
(74) *Attorney, Agent, or Firm* — Shumaker & Sieffert, P.A.

(57) ABSTRACT

This disclosure describes techniques for context switching. In one example, a graphics processing unit may be configured to generate one or more signatures for context information stored in on-chip memory of the graphics processing unit, determine whether the one or more signatures match any previously generated signatures for context information stored in one or more memories accessible by the graphics processing unit, store, to at least one of the one or more memories, any signature of the one or more signatures that is determined not to match any previously generated signature stored in at least one of the one or more memories, and store, to at least one of the one or more memories, the context information respectively corresponding to the one or more signatures determined not to match any previously generated signature stored in at least one of the one or more memories.

9 Claims, 9 Drawing Sheets

(58) Field of Classification Search
CPC .... G06F 2009/45575; G06F 8/34; G06F 8/60;
G06F 8/70; G06F 9/3834; G06F 9/4881;
G06F 9/3851; G06F 9/3887; G06F 9/46;
G06F 1/329; H04L 9/3247; H04L 9/14;
H04L 9/3242; H04L 43/04; H04L
45/7453; H04L 9/30; H04L 63/1416;
H04L 63/0428; H04L 2209/60; H04L
12/66; H04L 47/746; H04L 9/302; H04L
9/3249; G05B 23/0294; G06N 3/02
See application file for complete search history.

(56) References Cited

U.S. PATENT DOCUMENTS

| | | | |
|---|---|---|---|
| 8,745,366 B2 | 6/2014 | Wyatt et al. | |
| 8,769,188 B2 | 7/2014 | Tu et al. | |
| 8,978,135 B2 | 3/2015 | Pearson et al. | |
| 2001/0018736 A1* | 8/2001 | Hashimoto | G06F 21/10 713/1 |
| 2005/0132363 A1 | 6/2005 | Tewari et al. | |
| 2007/0103476 A1* | 5/2007 | Huang | G06T 15/005 345/522 |
| 2011/0074800 A1* | 3/2011 | Stevens | G06T 11/40 345/545 |
| 2011/0231630 A1* | 9/2011 | Dannowski | G06F 12/1036 711/207 |
| 2012/0176386 A1* | 7/2012 | Hutchins | G06T 1/20 345/522 |
| 2013/0305259 A1 | 11/2013 | Wang et al. | |
| 2014/0022263 A1* | 1/2014 | Hartog | G06T 1/20 345/506 |
| 2016/0371808 A1* | 12/2016 | Croxford | G06T 1/20 |

OTHER PUBLICATIONS

Yen, et al., "Signatures in Transactional Memory Systems," University of Wisconsin, Jan. 29, 2009, 303 pp.
Sanchez, et al., "Implementing Signatures for Transactional Memory," 40th Annual IEEE/ ACM Symposium on Microarchitecture, Dec. 1-5, 2007, 11 pp.
International Search Report and Written Opinion from International Application No. PCT/US2016/043846, dated Nov. 30, 2016, 13 pp.
Nuth P.R., et al., "A Mechanism for Efficient Context Switching", Proceedings of the International Conference on Computer Design—VLSI In Computers and Processors, Cambridge, MA., Oct. 14-16, 1991, XP010025224, published on IEEE Xplore on Aug. 6, 2002, 4 pp.
Wu Z., et al., "An Improved Method of Task Context Switching in OSEK Operating System", 20th International Conference on Advanced Information Networking and Applications (AINA'06), Vienna, Austria, Apr. 18-20, 2006, X13010915218, vol. 1, published on IEEE Xplore on May 15, 2006, 6 pp.
Zhou X., et al., "Rapid and Low-Cost Context-Switch through Embedded Processor Customization for Real-Time and Control Applications", 43rd ACM/IEEE Design Automation Conference, Jul. 24, 2006, XP010936430, 6 pp.
International Preliminary Report on Patentability from corresponding PCT Application Serial No. PCT/US2016/043846 dated Apr. 5, 2018 (8 pp).

* cited by examiner

EFFICIENT SAVING AND RESTORING OF CONTEXT INFORMATION FOR CONTEXT SWITCHES

TECHNICAL FIELD

This disclosure relates to techniques for context switching, and more specifically to techniques for efficient context switching.

BACKGROUND

Temporal partitioning of processing unit resources (e.g., on-chip memory) allows for various processes to run and make forward progress on the processing unit. This is achieved by pausing and swapping out one process (e.g., a first process) and allowing another process (e.g., a second process) to execute. This process is called context switching because the processing unit switches from executing the first process to executing the second process.

SUMMARY

In general, this disclosure describes techniques for context switching, and more specifically to techniques for efficient context switching. In examples of the disclosure, a processing unit, such as a CPU or GPU, may be configured to reduce the amount of saving and/or loading (i.e., restoration) of context information during a context switch. For example, a processing unit may be configured to perform context switching by generating one or more signatures for context information corresponding to a switch-out and/or switched-in process. The processing unit may be configured to use the one or more signatures corresponding to context information to determine whether to save and/or restore the corresponding context information (or subset thereof) during a context switch.

In one example, this disclosure describes a method for context switching by a processing unit comprising generating one or more signatures for current context information stored in on-chip memory of the processing unit. The method may include determining whether the one or more signatures match any previously generated signatures for previous context information stored in one or more memories accessible by the processing unit. The method may include storing, to at least one of the one or more memories, any signature of the one or more signatures that is determined not to match any previously generated signature stored in at least one of the one or more memories. The method may include storing, to at least one of the one or more memories, the current context information respectively corresponding to the one or more signatures determined not to match any previously generated signature stored in at least one of the one or more memories.

In another example, this disclosure describes a device comprising a processing unit configured to perform context switching. The processing unit may have on-chip memory. The device may further comprise an external memory to the processing unit. The processing unit may be configured to generate one or more signatures for current context information stored in on-chip memory of the processing unit. The processing unit may be configured to determine whether the one or more signatures match any previously generated signatures for previous context information stored in one or more memories accessible by the processing unit. The processing unit may be configured to store, to at least one of the one or more memories, any signature of the one or more signatures that is determined not to match any previously generated signature stored in at least one of the one or more memories. The processing unit may be configured to store, to at least one of the one or more memories, the current context information respectively corresponding to the one or more signatures determined not to match any previously generated signature stored in at least one of the one or more memories.

In another example, this disclosure describes an apparatus comprising means for generating one or more signatures for current context information stored in on-chip memory of a processing unit. The apparatus may include means for determining whether the one or more signatures match any previously generated signatures for previous context information stored in one or more memories accessible by the processing unit. The apparatus may include means for storing, to at least one of the one or more memories, any signature of the one or more signatures that is determined not to match any previously generated signature stored in at least one of the one or more memories. The apparatus may include means for storing, to at least one of the one or more memories, the current context information respectively corresponding to the one or more signatures determined not to match any previously generated signature stored in at least one of the one or more memories.

In another example, this disclosure describes a non-transitory computer-readable storage medium having instructions stored thereon that, when executed, cause one or more processors of a computing device to generate one or more signatures for current context information stored in on-chip memory of a processing unit. The instructions, when executed, may cause one or more processors of the computing device to determine whether the one or more signatures match any previously generated signatures for previous context information stored in one or more memories accessible by the processing unit. The instructions, when executed, may cause one or more processors of the computing device to store, to at least one of the one or more memories, any signature of the one or more signatures that is determined not to match any previously generated signature stored in at least one of the one or more memories. The instructions, when executed, may cause one or more processors of the computing device to store, to at least one of the one or more memories, the current context information respectively corresponding to the one or more signatures determined not to match any previously generated signature stored in at least one of the one or more memories.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
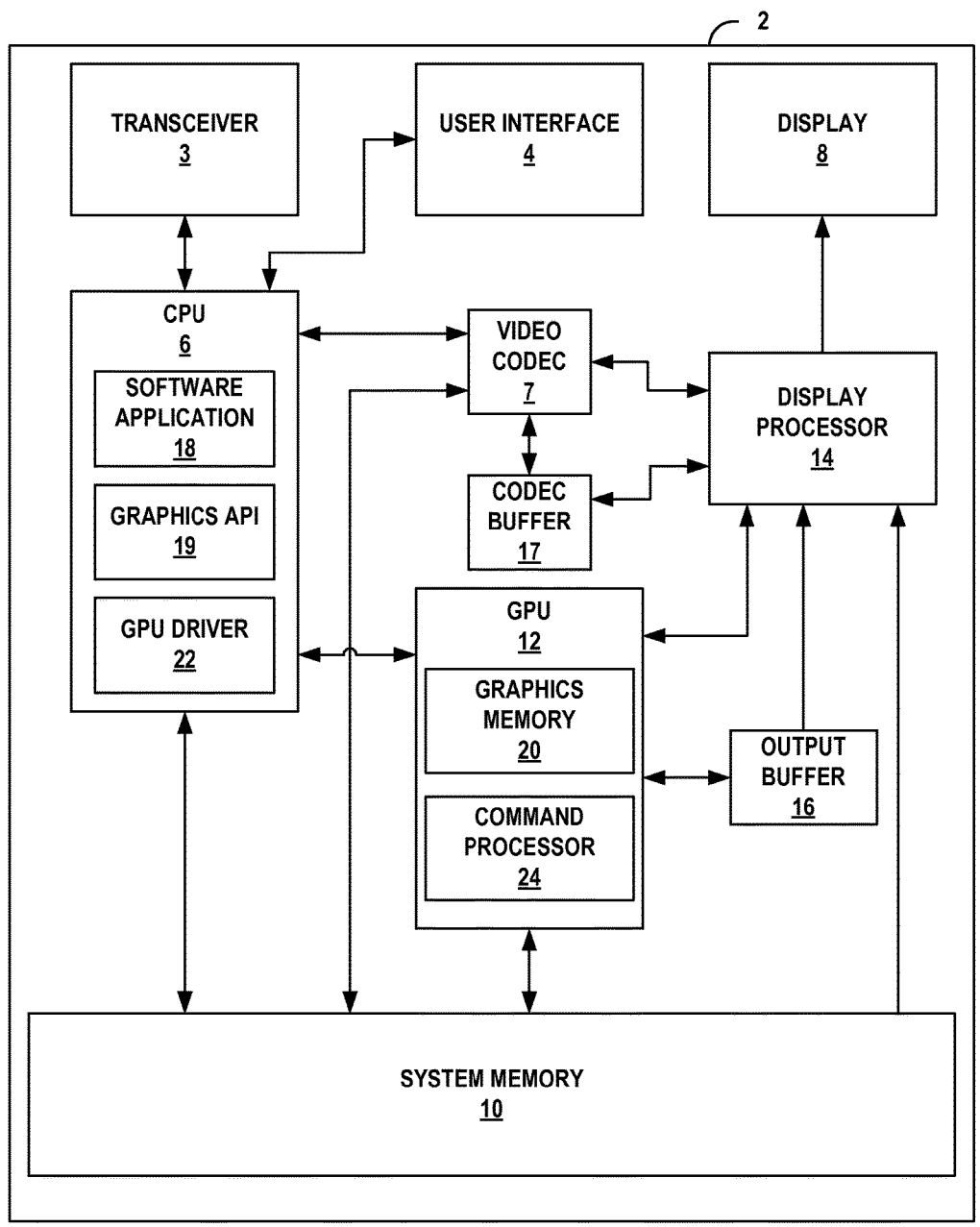
FIG. 1 is a block diagram showing an example computing device configured to use the techniques of this disclosure.

In general, the techniques of this disclosure are directed to using signatures to eliminate or reduce the number of redundant saves and/or restores of context information during a context switch in a computing system. For example, when a process is context switched (e.g., preempted by or swapped with another process), a processing unit (e.g., a CPU or GPU) may save any context information stored on the processing unit's on-chip memory to external memory (e.g., system memory) along with one or more signatures corresponding to the saved (or to be saved) context information. The processing unit may be configured to generate the one or more signatures by applying a signature algorithm to the context information.

The processing unit may be configured to generate a single signature for each application of the signature algorithm. For example, if two signatures are generated for the context information, that means that two signature algorithms were applied to two different sets of context information. In this example, the two signature algorithms may be the same or different, and the two different sets of context information corresponding to the same process may or may not have any overlap. A signature algorithm may result in an MD5 hash, a cyclic redundancy check (CRC), a bloom filter signature, or other identifier output by a hashing, signature, or filter function. For example, in an example involving an MD5 hash, the processing unit may be configured to apply an MD5 hash algorithm to context information to generate a corresponding signature (i.e., the MD5 hash value in this example).

As will be described in more detail below, the processing unit generates signatures to determine whether context information for a switch-out process has changed and/or has previously been saved to external memory. For example, if the context information (or a subset thereof) for the switched-out process has been previously saved to external memory and has not changed, e.g., as indicated by a match between a signature for the context information for the switch-out process and a signature for the context information previously saved to external memory, then the processing unit may not save the context information (or subset thereof) for the switched-out process, thereby avoiding a redundant save operation. As another example, if the context information (or a subset thereof) for the switched-in process has been previously saved to external memory and the context information in the processing unit's on-chip memory is the same as the context information previously stored, e.g., as indicated by a match between a signature of the context information for the switched-in process and a signature for the context information previously save to external memory, then the processing unit may not restore the context information (or subset thereof), thereby avoiding an unnecessary restore operation. By avoiding redundantly storing previously stored information, e.g., with the use of signatures, the present disclosure may enable faster context switching. Likewise, by avoiding redundantly restoring previously stored information, e.g., with the use of signatures, the present disclosure may enable faster context switching.

In some examples, one or more techniques described herein may leverage any commonality between applications (e.g., games) sharing the same engine (e.g., game engine). For example, two games developed using the same game engine may share common resources, such as shaders and the like, as libraries to game developers because both games use the same game engine library to draw the same or similar object. In this way, two different games may have a common item or a similar item (e.g., a tree, a wall, a texture, etc.). Though the size, orientation, and other attributes of the common or similar item may be different between two games, context switching between these two games may avoid redundant save and/or restore operations where the context information between the games relates to common or similar subject matter. For example, the way the tree is drawn (color, texture, etc.) may be described in context information while the dimensions/coordinates of the tree itself correspond to the data that a GPU processes. If the GPU detects that the context information is the same for the new process (e.g., a process associated with a second game) as the preempted one (e.g., a process associated with a first game), the GPU may be configured to not restore the context information, and may be configured to restore the data.

FIG. 1 is a block diagram illustrating an example computing device that may be configured to implement one or more aspects of this disclosure. As shown in FIG. 1, computing device 2 may be, for example, a personal computer, a desktop computer, a laptop computer, a tablet computer, a computer workstation, a video game platform or console, a mobile telephone (e.g., a cellular or satellite telephone), a landline telephone, an Internet telephone, a handheld device (e.g., a portable video game device or a personal digital assistant (PDA)), a personal music player, a video player, a display device, a television, a television set-top box, a server, an intermediate network device, a mainframe computer, any mobile device, or any other type of device that processes and/or displays graphical data. In the example of FIG. 1, computing device 2 may include central processing unit (CPU) 6, system memory 10, and graphics processing unit (GPU) 12. Computing device 2 may also include display processor 14, transceiver 3, user interface 4, video codec 7, and display 8. In some examples, video codec 7 may be a software application, such as a software application among the one or more software applications 18 configured to be processed by CPU 6 or other components of computing device 2. In other examples, video codec 7 may be a hardware component different from CPU 6, a software application that runs on a component different from CPU 6, or a combination of hardware and software.

GPU 12 may be designed with a single instruction, multiple data (SIMD) structure. In the SIMD structure, GPU 12 may include a plurality of SIMD processing elements, where each SIMD processing element executes the same commands, but on different data. A particular command executing on a particular SIMD processing element is referred to as a thread. Each SIMD processing element may be considered as executing a different thread because the data for a given thread may be different; however, the thread executing on a processing element is the same command as the command executing on the other processing elements. In this way, the SIMD structure allows GPU 12 to perform many tasks in parallel (e.g., at the same time).

CPU 6 and/or GPU 12 are configured to perform context switching. In some examples, a context switch may be triggered by a scheduling processor, scheduling unit, or scheduling scheme in a multitasking environment. For example, CPU 6 and/or GPU 12 may include a scheduling processor, a scheduling unit, or a scheduling scheme configured to trigger context switching. In other examples, a context switch may be triggered by an interrupt handler based on one or more interrupts. In other examples, a context switch may be triggered when a transition between modes is required, such as when switching over from kernel mode to user mode.

As used herein, the term "processing unit" means CPU 6 and/or GPU 12. As used herein, the term "process" includes process, thread, and/or task. Context switching is where a processing unit switches from executing one process to executing a different process. This process is called context switching because the processing unit switches from executing the first process to executing the second process. The switched-out process may be referred to as being preempted by the second process (or switched-in process). To ensure any forward progress that is made during execution of the first process is not lost when the processing unit switches to the second process, context information associated with the first process that is currently stored in on-chip memory of the processing unit may be saved to some external memory (e.g., system memory 10) to enable recovery (i.e., restoration) of that data when the processing unit switches back to the first process to resume execution thereof.

As will be described in more detail below, the techniques described herein may reduce the amount of saving and/or loading (i.e., restoration) of context information. By reducing the number of saves and restores of context information, processing resources may be used more efficiently by reducing latency (e.g., reducing processing resources such as clock cycles needed for saving and/or restoring context information). Power and energy consumption may also be reduced by the techniques described herein. For example, the techniques described herein avoid blindly saving all context information when a process is switched-out. Additionally, the techniques described herein avoid blindly restoring all context information when a process is switched-in. As will also be described in more detail below, the techniques described herein enable reduction of the amount of saving and/or restoration of context information by determining whether the context information has changed.

In some examples, as used herein, the term "context information" means the minimal set of data corresponding to a process that is needed to resume the process following a context-switch. In such examples, the minimal set of data corresponding to a process that is needed to resume the process following a context switch may refer to the minimal set of data that must be resident on the processing unit to resume processing following a context switch, or may refer to the minimal set of data that must be saved to and/or restored from external memory (e.g., off-chip memory such as system memory 10) to resume processing following a context switch. The minimal set of data saved for a process that is switched-out may or may not be the same minimal set of data that is restored for the process when that process is switched-in.

As one example, it may be that the processing unit saves context information corresponding to a process when the process is switched-out, but the processing unit may not need to restore any of the context information or may only need to restore a portion of the saved context information upon switching-in the process during a subsequent context switch. As another example, it may be that the processing unit does not need to save any context information (or only needs to save a portion of context information) corresponding to a process when the process is switched-out, but the processing unit may need to restore the context information or a part thereof upon switching-in the process during a subsequent context switch.

Context information may be grouped into different types of context information. The groups may be based on context information type and/or how the context information was generated. For example, control register information, constant information, and other software programmed stated information may each be an individual group of context information or may fall within the same group of context information (e.g., software programmed state information). As another example, status flag information, dirty bit information, and other hardware modified state information may each be an individual group of context information or may fall within the same group of context information (e.g., hardware modified state information). As another example, general purpose register information, on-chip memory information, and other hardware generated state information may each be an individual group of context information or may fall within the same group of context information (e.g., hardware generated state information).

In other examples, as used herein, the term "context information" means state information, which may comprise the minimal set of data corresponding to a process that is needed to resume the process following a context-switch. In such examples, the state information corresponding to a process that is needed to resume the process following a context switch may refer to the state information that must be resident on the processing unit to resume processing following a context switch, or may refer to the state information that must be saved to and/or restored from external memory (e.g., off-chip memory such as system memory 10) to resume processing following a context switch. The state information saved for a process that is switched-out may or may not be the same state information that is restored for the process when that process is switched-in.

In other examples, as used herein, the term "context information" means a subset of the minimal set of data corresponding to a process that is needed to resume the process following a context-switch. For example, a subset of the minimal set of data may comprise one or more groups of context information. The groups may be based on context information type and/or how the context information was generated. For example, control register information, constant information, and other software programmed context information may each be an individual group of context information or may fall within the same group of context information (e.g., software programmed context information). As another example, status flag information, dirty bit information, and other hardware modified context information may each be an individual group of context information or may fall within the same group of context information (e.g., hardware modified context information). As another example, general purpose register information, on-chip memory information, and other hardware generated context information may each be an individual group of context information or may fall within the same group of context information (e.g., hardware generated context information).

In yet other examples, as used herein, the term "context information" means state information, which may be a subset of the minimal set of data corresponding to a process that is needed to resume the process following a context-switch. For example, a subset of the minimal set of data may comprise one or more groups of state information. The groups may be based on state information type and/or how the state information was generated. For example, control register information, constant information, and other software programmed stated information may each be an individual group of state information or may fall within the same group of state information (e.g., software programmed state information).

As another example, status flag information, dirty bit information, and other hardware modified state information may each be an individual group of state information or may fall within the same group of state information (e.g., hardware modified state information). As another example, general purpose register information, on-chip memory information, and other hardware generated state information may each be an individual group of state information or may fall within the same group of context information (e.g., hardware generated state information).

In this disclosure, use of "state information," "context information," or any other term does not control which, if any, of the definitions of "context information" applies to a particular example, embodiment, or the like. Rather, the various definitions of "context information" are intended to help expand upon the examples set forth throughout this disclosure. In this regard, unless explicitly described otherwise, one or more of "context information" definitions set forth herein applies to every example of the techniques described herein. Additionally, the terms "state" and "context" may or may not be interchangeable terms depending on the example.

Context information may include one or more of software programmed state information, hardware modified state information, hardware generated state and/or data information. Software programmed state information may include control register information, constant information, etc. For example, software programmed state information for GPU 12 may include the stream of commands received by GPU 12 from, for example, GPU driver 22 executing on CPU 6 for a particular process. In this example, such state information may be found in, for example, control registers. Hardware modified state information may include any changes made to software programmed state information during execution of the corresponding process. For example, hardware modified state information may include status flag information, dirty bit information, etc. Hardware generated state information may include state information that is generated by hardware as a result of executing the corresponding process. For example, hardware generated state information may include general purpose register information, on-chip memory information, etc.

As used herein, a "switched-out" process during a context switch may be a process that was executing on a processing unit (e.g., GPU 12) up to the context switch and was "switched-out" for the "switched-in" process. A "switched-in" process may be a process that is executing on a processing unit (e.g., GPU 12) as a result of the context switch. Following the context switch, the switched-out process is the process that was previously executing on the processing unit, but is no longer executing as a result of the context switch.

As an example, context switching from a first process to a second process may mean the first process is the switched-out process, and the second process is the switched-in process. As another example, context switching from a process and context switching to a process may respectively refer to the switched-out process and the switched-in process. A switched-in process may be switched-out as the result of another context switch. Context switching may result in one or more processes being switched-out or switched-in one or more times. For example, a long running process may be switched-out and switched-in multiple times as a result of multiple context switches to accommodate execution of different processes. In this regard, a switched-in process may be a process that is newly executing as a result of a context switch, or a switched-in process may be a process that is executing as a result of a context switch but may not be considered a newly executing process because the switched-in process may have been a switched-out process in a prior context switch (i.e., rather than newly executing, executing may be considered to have been resumed).

As another example, a switched-out process may refer to a process that is executing on a processing unit and preempted by another process (e.g., switched-in process). As another example, a switched-out process may refer to a process for which execution is interrupted or paused (e.g., stopped, halted, postponed, etc.) for a switched-in process. As another example, a switched-out process may refer to a process that is swapped out for a switched-in process. As another example, a switched-out process may refer to a process that is scheduled to be swapped out for a switched-in process. As another example, a switched-out process may refer to a preempted process.

As another example, a switched-in process may refer to a process that preempted another process (e.g., a switched-out process) executing on a processing unit, and is executing or is not executing on the processing unit depending whether the context switch has been completed (e.g., performed). As another example, a switched-in process may refer to execution of a process on a processing unit that results in interrupting or pausing (e.g., stopping, halting, postponing, etc.) execution of another process (e.g., switched-out process). As another example, a switched-in process may refer to a process that is swapped in for a switched-out process. As another example, a switched-in process may refer to a process that is scheduled to be swapped in for a switched-out process.

The term "switched-out" process does not imply that the context switch is currently being performed or has been completed (e.g., performed). For example, a switched-out process may refer to a process that is executing on a processing unit that will be or is otherwise scheduled to be swapped out for another process (e.g., a switched-in process), or may refer to a process that is not executing on the processing unit as a result of (e.g., following) a context switch. As another example, a switched-out process may refer to a process before, during, or after a context switch. Similarly, the term "switched-in" process does not imply that the context switch is currently being performed or has been completed (e.g., performed). For example, a switched-in process may refer to a process that is not executing on a processing unit (e.g., on the processing unit that is executing the process being preempted by the switched-in process) that will be or is otherwise scheduled to be swapped out for another process (e.g., a switched-out process), or may refer to a process that is executing on the processing unit as a result of (e.g., following) a context switch. As another example, a switched-in process may refer to a process before, during, or after a context switch.

In some examples, system memory 10 is a non-transitory storage medium. The term "non-transitory" may indicate that the storage medium is not embodied in a carrier wave or a propagated signal. However, the term "non-transitory" should not be interpreted to mean that system memory 10 is non-movable or that its contents are static. As one example, system memory 10 may be removed from computing device 2, and moved to another device. As another example, memory, substantially similar to system memory 10, may be inserted into computing device 2. In certain examples, a non-transitory storage medium may store data that can, over time, change (e.g., in RAM).

While the one or more software applications 18 are conceptually shown as inside CPU 6, it is understood that these one or more software applications 18 may be stored in system memory 10, memory external to but accessible to computing device 2, or a combination thereof. The external memory may, for example, be continuously intermittently accessible to computing device 2.

Display processor 14 may utilize a tile-based architecture. In some examples, a tile is an area representation of pixels comprising a height and width with the height being one or more pixels and the width being one or more pixels. In such examples, tiles may be rectangular or square in nature. In other examples, a tile may be a shape different than a square or a rectangle. Display processor 14 may fetch multiple image layers (e.g., foreground and background) from at least one memory. For example, display processor 14 may fetch image layers from a frame buffer to which a GPU outputs graphical data in the form of pixel representations and/or other memory.

As another example, display processor may 14 may fetch image layers from on-chip memory of video codec 7, on-chip memory of GPU 12, output buffer 16, codec buffer 17, and/or system memory 10). The multiple image layers may include foreground layers and/or background layers. As used herein, the term "image" is not intended to mean only a still image. Rather, an image or image layer may be associated with a still image (e.g., the image or image layers when blended may be the image) or a video (e.g., the image or image layers when blended may be a single image in a sequence of images that when viewed in sequence create a moving picture or video).

Display processor 14 may process pixels from multiple layers. Example pixel processing that may be performed by display processor 14 may include up-sampling, down-sampling, scaling, rotation, and other pixel processing. For example, display processor 14 may process pixels associated with foreground image layers and/or background image layers. Display processor 14 may blend pixels from multiple layers, and write back the blended pixels into memory in tile format. Then, the blended pixels are read from memory in raster format and sent to display 8 for presentment.

Video codec 7 may receive encoded video data. Computing device 2 may receive encoded video data from, for example, a storage medium, a network server, or a source device (e.g., a device that encoded the data or otherwise transmitted the encoded video data to computing device 2, such as a server). In other examples, computing device 2 may itself generate the encoded video data. For example, computing device 2 may include a camera for capturing still images or video. The captured data (e.g., video data) may be encoded by video codec 7. Encoded video data may include a variety of syntax elements generated by a video encoder for use by a video decoder, such as video codec 7, in decoding the video data.

While video codec 7 is described herein as being both a video encoder and video decoder, it is understood that video codec 7 may be a video decoder without encoding functionality in other examples. Video data decoded by video codec 7 may be sent directly to display processor 14, may be sent directly to display 8, or may be sent to memory accessible to display processor 14 or GPU 12 such as system memory 10, output buffer 16, or codec buffer 17. In the example shown, video codec 7 is connected to display processor 14, meaning that decoded video data is sent directly to display processor 14 and/or stored in memory accessible to display processor 14. In such an example, display processor 14 may issue one or more memory requests to obtain decoded video data from memory in a similar manner as when issuing one or more memory requests to obtain graphical (still image or video) data from memory (e.g., output buffer 16) associated with GPU 12.

Video codec 7 may operate according to a video compression standard, such as the ITU-T H.264, Advanced Video Coding (AVC), or ITU-T H.265, High Efficiency Video Coding (HEVC), standards. The techniques of this disclosure, however, are not limited to any particular coding standard.

Transceiver 3, video codec 7, and display processor 14 may be part of the same integrated circuit (IC) as CPU 6 and/or GPU 12, may be external to the IC or ICs that include CPU 6 and/or GPU 12, or may be formed in the IC that is external to the IC that includes CPU 6 and/or GPU 12. For example, video codec 7 may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof.

Computing device 2 may include additional modules or processing units not shown in FIG. 1 for purposes of clarity. For example, computing device 2 may include a speaker and a microphone, neither of which are shown in FIG. 1, to effectuate telephonic communications in examples where computing device 2 is a mobile wireless telephone, or a speaker where computing device 2 is a media player. Computing device 2 may also include a video camera. Furthermore, the various modules and units shown in computing device 2 may not be necessary in every example of computing device 2. For example, user interface 4 and display 8 may be external to computing device 2 in examples where computing device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of display 8. Transceiver 3 may include circuitry to allow wireless or wired communication between computing device 2 and another device or a network. Transceiver 3 may include modulators, demodulators, amplifiers and other such circuitry for wired or wireless communication. In some examples, transceiver 3 may be integrated with CPU 6.

CPU 6 may be a microprocessor, such as a central processing unit (CPU) configured to process instructions of a computer program for execution. CPU 6 may comprise a general-purpose or a special-purpose processor that controls operation of computing device 2. A user may provide input to computing device 2 to cause CPU 6 to execute one or more software applications, such as one or more software application 18. The one or more software applications 18 that execute on CPU 6 (or on one or more other components of computing device 2) may include, for example, an operating system, a word processor application, an email application, a spreadsheet application, a media player application, a video game application, a graphical user interface application, or another type of software application that uses graphical data for 2D or 3D graphics. Additionally, CPU 6 may execute GPU driver 22 for controlling the operation of GPU 12. The user may provide input to computing device 2 via one or more input devices (not shown) such as a keyboard, a mouse, a microphone, a touch pad or another input device that is coupled to computing device 2 via user interface 4.

One or more software applications 18 that execute on, for example, CPU 6 may include one or more graphics rendering instructions that instruct CPU 6 to cause the rendering of graphics data to display 8. The instructions may include instructions to process 3D graphics as well as instructions to process 2D graphics. In some examples, the software instructions may conform to a graphics application programming interface (API) 19. Graphics API 19 may be, for example, an Open Graphics Library (OpenGL®) API, an Open Graphics Library Embedded Systems (OpenGL ES) API, a Direct3D API, an X3D API, a RenderMan API, a WebGL API, an Open Computing Language (OpenCL™), or any other public or proprietary standard GPU compute API. In order to process the graphics rendering instructions of one or more software applications 18 executing on CPU 6, CPU 6, during execution of one or more software applications 18, may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

One or more software applications 18 may include one or more drawing instructions that instruct GPU 12 to render a graphical user interface (GUI), a graphics scene, graphical data, or other graphics related data. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

GPU 12 may be configured to perform graphics operations to render one or more graphics primitives to display 8. Thus, when one or more software applications 18 executing on CPU 6 requires graphics processing, CPU 6 may provide graphics rendering commands along with graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 8 more quickly than drawing the scenes directly to display 8 using CPU 6.

One or more software applications 18 may invoke GPU driver 22, to issue one or more commands to GPU 12 for rendering one or more graphics primitives into displayable graphics images (e.g., displayable graphical data). For example, one or more software applications 18 may, when executed, invoke GPU driver 22 to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like.

Based on the instructions issued by one or more software applications 18 to GPU driver 22, GPU driver 22 may formulate one or more commands that specify one or more operations for GPU 12 to perform in order to render the primitive. When GPU 12 receives a command from CPU 6, a graphics processing pipeline may execute on shader processors of GPU 12 to decode the command and to configure a graphics processing pipeline to perform the operation specified in the command. For example, an input-assembler in the graphics processing pipeline may read primitive data and assemble the data into primitives for use by the other graphics pipeline stages in a graphics processing pipeline. After performing the specified operations, the graphics processing pipeline outputs the rendered data to output buffer 16 accessible to display processor 14. In some examples, the graphics processing pipeline may include fixed function logic and/or be executed on programmable shader cores.

Output buffer 16 stores destination pixels for GPU 12 and/or video codec 7 depending on the example. Each destination pixel may be associated with a unique screen pixel location. Similarly, output buffer 17 may store destination pixels for video codec 7 depending on the example. Codec buffer 17 may be considered a frame buffer associated with video codec 7. In some examples, output buffer 16 and/or codec buffer 17 may store color components and a destination alpha value for each destination pixel. For example, output buffer 16 and/or codec buffer 17 may store pixel data according to any format. For example, output buffer 16 and/or codec buffer 17 may store Red, Green, Blue, Alpha (RGBA) components for each pixel where the "RGB" components correspond to color values and the "A" component corresponds to a destination alpha value. As another example, output buffer 16 and/or codec buffer 17 may store pixel data according to the YCbCr color format, YUV color format, RGB color format, or according to any other color format. Although output buffer 16 and system memory 10 are illustrated as being separate memory units, in other examples, output buffer 16 may be part of system memory 10. For example, output buffer 16 may be allocated memory space in system memory 10. Output buffer 16 may constitute a frame buffer. Further, as discussed above, output buffer 16 may also be able to store any suitable data other than pixels.

Similarly, although codec buffer 17 and system memory 10 are illustrated as being separate memory units, in other examples, codec buffer 17 may be part of system memory 10. For example, codec buffer 17 may be allocated memory space in system memory 10. Codec buffer 17 may constitute a video codec buffer or a frame buffer. Further, as discussed above, codec buffer 17 may also be able to store any suitable data other than pixels. In some examples, although output buffer 16 and codec buffer 17 are illustrated as being separate memory units, output buffer 16 and codec buffer 17 may be the same buffer or different parts of the same buffer.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In some examples, GPU 12 may be on-chip with CPU 6, such as in a system on chip (SOC) GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor. In some examples, GPU 12 may be specialized hardware that includes integrated and/or discrete logic circuitry that provides GPU 12 with massive parallel processing capabilities suitable for graphics processing. In some instances, GPU 12 may also include general-purpose processing capabilities, and may be referred to as a general-purpose GPU (GPGPU) when implementing general-purpose processing tasks (e.g., so-called "compute" tasks).

In some examples, graphics memory 20 may be part of GPU 12. For example, graphics memory 20 may be on-chip memory or memory that is physically integrated into the integrated circuit chip of GPU 12. If graphics memory 20 is on-chip, GPU 12 may be able to read values from or write values to graphics memory 20 more quickly than reading values from or writing values to system memory 10 via a system bus. Thus, GPU 12 may read data from and write data to graphics memory 20 without using a bus. In other words, GPU 12 may process data locally using a local storage, instead of off-chip memory. Such graphics memory 20 may be referred to as on-chip memory. This allows GPU 12 to operate in a more efficient manner by eliminating the need of GPU 12 to read and write data via a bus, which may experience heavy bus traffic and associated contention for bandwidth. In some instances, however, GPU 12 may not include a separate memory, but instead utilize system memory 10 via a bus. Graphics memory 20 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10. Display processor 14 may retrieve the image from system memory 10 and/or output buffer 16 and output values that cause the pixels of display 8 to illuminate to display the image. In some examples, display processor 14 may be configured to perform 2D operations on data to be displayed, including scaling, rotation, blending, and compositing. Display 8 may be the display of computing device 2 that displays the image content generated by GPU 12. Display 8 may be a liquid crystal display (LCD), an organic light emitting diode display (OLED), a cathode ray tube (CRT) display, a plasma display, or another type of display device. In some examples, display 8 may be integrated within computing device 2. For instance, display 8 may be a screen of a mobile telephone. In other examples, display 8 may be a stand-alone device coupled to computing device 2 via a wired or wireless communications link. For example, display 8 may be a computer monitor or flat panel display connected to a computing device (e.g., personal computer, mobile computer, tablet, mobile phone, etc.) via a cable or wireless link.

CPU 6 processes instructions for execution within computing device 2. CPU 6 may generate a command stream using a driver (e.g., GPU driver 22 which may be implemented in software executed by CPU 6) for execution by GPU 12. That is, CPU 6 may generate a command stream that defines a set of operations to be performed by GPU 12.

CPU 6 may generate a command stream to be executed by GPU 12 that causes viewable content to be displayed on display 8. For example, CPU 6 may generate a command stream that provides instructions for GPU 12 to render graphics data that may be stored in output buffer 16 for display at display 8. In this example, CPU 6 may generate a command stream that is executed by a graphics rendering pipeline.

Additionally or alternatively, CPU 6 may generate a command stream to be executed by GPU 12 that causes GPU 12 to perform other operations. For example, in some instances, CPU 6 may be a host processor that generates a command stream for using GPU 12 as a general purpose graphics processing unit (GPGPU). In this way, GPU 12 may act as a secondary processor for CPU 6. For example, GPU 12 may carry out a variety of general purpose computing functions traditionally carried out by CPU 6. Examples include a variety of image processing functions, including video decoding and post processing (e.g., deblocking, noise reduction, color correction, and the like) and other application specific image processing functions (e.g., facial detection/recognition, pattern recognition, wavelet transforms, and the like).

In some examples, GPU 12 may collaborate with CPU 6 to execute such GPGPU applications. For example, CPU 6 may offload certain functions to GPU 12 by providing GPU 12 with a command stream for execution by GPU 12. In this example, CPU 6 may be a host processor and GPU 12 may be a secondary processor. CPU 6 may communicate with GPU 12 to direct GPU 12 to execute GPGPU applications via GPU driver 22.

GPU driver 22 may communicate, to GPU 12, one or more command streams that may be executed by shader units of GPU 12. GPU 12 may include command processor 24 that may receive the one or more command streams from GPU driver 22. Command processor 24 may be any combination of hardware and software configured to receive and process one or more command streams. As such, command processor 24 is a stream processor. In some examples, instead of command processor 24, any other suitable stream processor may be usable in place of command processor 24 to receive and process one or more command streams and to perform the techniques disclosed herein. In one example, command processor 24 may be a hardware processor. In the example shown in FIG. 1, command processor 24 may be included in GPU 12. In other examples, command processor 24 may be a unit that is separate from CPU 6 and GPU 12. Command processor 24 may also be known as a stream processor, command/stream processor, and the like to indicate that it may be any processor configured to receive streams of commands and/or operations.

Command processor 24 may process one or more command streams including scheduling operations included in the one or more command streams for execution by GPU 12. Specifically, command processor 24 may process the one or more command streams and schedule the operations in the one or more command streams for execution by shader units. In operation, GPU driver 22 may send to command processor 24 a command stream comprising a series of operations to be executed by GPU 12. Command processor 24 may receive the stream of operations that comprise the command stream and may process the operations of the command stream sequentially based on the order of the operations in the command stream and may schedule the operations in the command stream for execution by shader processors of shader units of GPU 12.

Figure 2:
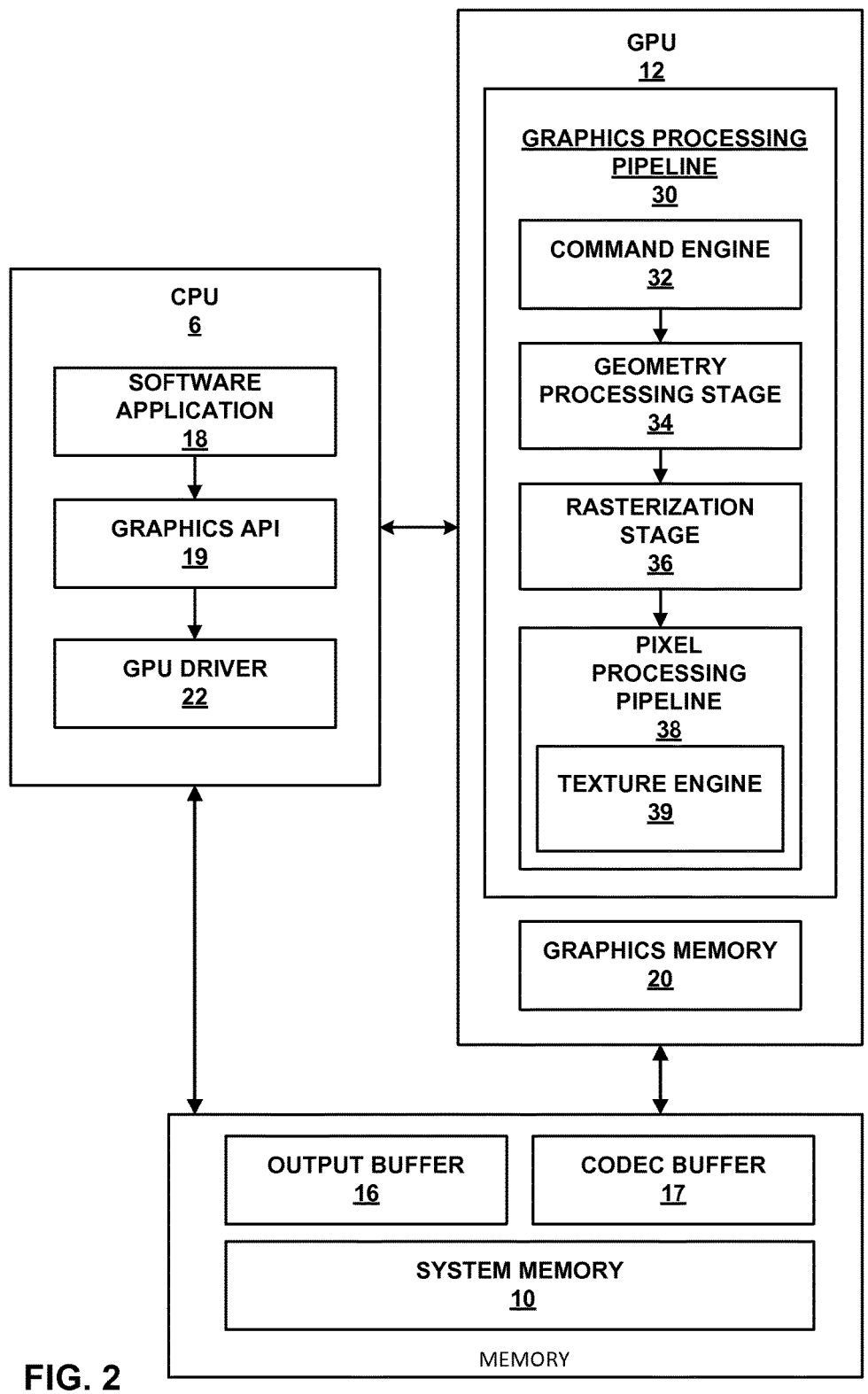
FIG. 2 is a block diagram showing components of FIG. 1 in more detail.

FIG. 2 is a block diagram illustrating example implementations of CPU 6, GPU 12, and system memory 10 of FIG. 1 in further detail. CPU 6 may include at least one software application 18, graphics API 19, and GPU driver 22, each of which may be one or more software applications or services that execute on CPU 6. GPU 12 may include graphics processing pipeline 30 that includes a plurality of graphics processing stages that operate together to execute graphics processing commands. Graphics processing pipeline 30 is one example of a graphics processing pipeline, and this disclosure applies to any other graphics processing or graphics processing pipeline. GPU 12 may be configured to execute graphics processing pipeline 30 in a variety of rendering modes, including a binning rendering mode and a direct rendering mode. During rendering, each process may have corresponding context information. Context information may include information corresponding to a process associated with graphics processing pipeline 30. For example, such a process may be a graphics processing pipeline 30 process. In the context of context switching in GPU 12, the context information may include or otherwise constitute rendering state information. GPU 12 may context switch from one process to another process at any point in the graphics processing pipeline 30.

In some examples, GPU 12 may context switch from one application to another application that may contain draws (e.g., graphics) or dispatches (e.g., compute). For example, GPU 12 may context switch from one draw to another draw or dispatch. In another example, GPU 12 may context switch from one dispatch to another dispatch or draw.

In other examples, GPU 12 may context switch when one or more processes executing on GPU 12 are preempted by one or more processes sent to GPU 12 by CPU 6 for execution by GPU 12, such as a CPU process or one or more commands of a command stream sent from GPU driver 22 executing on CPU 6 for a particular process. Therefore, in the examples described throughout this disclosure, a switched-in process and/or a switched-out process may be a process transmitted from a CPU (e.g., CPU 6) to a GPU (e.g., GPU 12).

In other examples, GPU 12 may context switch when one or more processes executing on GPU 12 are preempted by one or more processes sent to GPU 12 by a workload processing unit (e.g., a CPU, any other processing unit, or any work loading processing unit on GPU 12) for execution by GPU 12. Therefore, in the examples described throughout this disclosure, a switched-in process and/or a switched-out process may be a process transmitted from a workload processing unit to a GPU (e.g., GPU 12). As another example, a switched-in process and/or a switched-out process may be a process transmitted from a workload processing unit part of a GPU to another processing unit part of the GPU. In other examples, a switched-in process and/or a switched-out process, as described throughout this disclosure, may be a process transmitted from any processing unit to a GPU (e.g., GPU 12).

In other examples, CPU 6 may context switch when one or more processes executing on CPU 6 are preempted by one or more processes sent to CPU 6 by GPU 12 for execution by CPU 6, such as a process that GPU 12 offloads to CPU 6 for processing. Therefore, in the examples described throughout this disclosure, a switched-in process and/or a switched-out process may be a process transmitted from a GPU (e.g., GPU 12) to a CPU (e.g., CPU 6).

In other examples, a switched-in process and/or a switched-out process, as described throughout this disclosure, may be a process transmitted from any processing unit to any other processing unit. In other examples, a switched-in process and/or a switched-out process, as described throughout this disclosure, may be any switched-in process and/or any switched-out process.

As shown in FIG. 2, graphics processing pipeline 30 may include command engine 32, geometry processing stage 34, rasterization stage 36, and pixel processing pipeline 38. Pixel processing pipeline 38 may include texture engine 39. Each of the components in graphics processing pipeline 30 may be implemented as fixed-function components, programmable components (e.g., as part of a shader program executing on a programmable shader unit), or as a combination of fixed-function and programmable components. Memory available to or otherwise accessible to CPU 6 and GPU 12 may include, for example, system memory 10, output buffer 16, codec buffer 17, and any on-chip memory of CPU 6, and any on-chip memory of GPU 12. Output buffer 16, which may be termed a frame buffer in some examples, may store rendered image data.

One or more software applications 18 may be any application that utilizes any functionality of GPU 12 or that does not utilize any functionality of GPU 12. For example, one or more applications 18 may be any application where execution by CPU 6 causes (or does not cause) one or more commands to be offloaded to GPU 12 for processing. Examples of one or more applications 18 may include an application that causes CPU 6 to offload 3D rendering commands to GPU 12 (e.g., a video game application), an application that causes CPU 6 to offload 2D rendering commands to GPU 12 (e.g., a user interface application), or an application that causes CPU 6 to offload general compute tasks to GPU 12 (e.g., a GPGPU application). As another example, one or more applications 18 may include firmware resident on any component of computing device 2, such as CPU 6, GPU 12, display processor 14, or any other component. Firmware may or may not utilize or invoke the functionality of GPU 12.

One or more software applications 18 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

One or more software applications 18 may invoke GPU driver 22, via graphics API 19, to issue one or more commands to GPU 12 for rendering one or more graphics primitives into displayable graphics images. For example, one or more software applications 18 may invoke GPU driver 22, via graphics API 19, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered.

The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by one or more software applications 18 to GPU driver 22, GPU driver 22 may formulate one or more commands that specify one or more operations for GPU 12 to perform in order to render the primitive. When GPU 12 receives a command from CPU 6, graphics processing pipeline 30 decodes the command and configures one or more processing elements within graphics processing pipeline 30 to perform the operation specified in the command. After performing the specified operations, graphics processing pipeline 30 outputs the rendered data to memory (e.g., output buffer 16) accessible by display processor 14. Graphics pipeline 30 may be configured to execute in one of a plurality of different rendering modes, including a binning rendering mode and a direct rendering mode.

GPU driver 22 may be further configured to compile one or more shader programs, and to download the compiled shader programs onto one or more programmable shader units contained within GPU 12. The shader programs may be written in a high level shading language, such as, e.g., an OpenGL Shading Language (GLSL), a High Level Shading Language (HLSL), a C for Graphics (Cg) shading language, etc. The compiled shader programs may include one or more instructions that control the operation of a programmable shader unit within GPU 12. For example, the shader programs may include vertex shader programs and/or pixel shader programs. A vertex shader program may control the execution of a programmable vertex shader unit or a unified shader unit, and include instructions that specify one or more per-vertex operations. A pixel shader program may include pixel shader programs that control the execution of a programmable pixel shader unit or a unified shader unit, and include instructions that specify one or more per-pixel operations.

Graphics processing pipeline 30 may be configured to receive one or more graphics processing commands from CPU 6, via GPU driver 22, and to execute the graphics processing commands to generate displayable graphics images. As discussed above, graphics processing pipeline 30 includes a plurality of stages that operate together to execute graphics processing commands. It should be noted, however, that such stages need not necessarily be implemented in separate hardware blocks. For example, portions of geometry processing stage 34 and pixel processing pipeline 38 may be implemented as part of a unified shader unit. Graphics pipeline 30 may be configured to execute in one of a plurality of different rendering modes, including a binning rendering mode and a direct rendering mode.

Command engine 32 may receive graphics processing commands and configure the remaining processing stages within graphics processing pipeline 30 to perform various operations for carrying out the graphics processing commands. The graphics processing commands may include, for example, drawing commands and graphics state commands. The drawing commands may include vertex specification commands that specify positional coordinates for one or more vertices and, in some instances, other attribute values associated with each of the vertices, such as, e.g., color coordinates, normal vectors, texture coordinates and fog coordinates. The graphics state commands may include primitive type commands, transformation commands, lighting commands, etc. The primitive type commands may specify the type of primitive to be rendered and/or how the vertices are combined to form a primitive. The transformation commands may specify the types of transformations to perform on the vertices. The lighting commands may specify the type, direction and/or placement of different lights within a graphics scene. Command engine 32 may cause geometry processing stage 34 to perform geometry processing with respect to vertices and/or primitives associated with one or more received commands.

Geometry processing stage 34 may perform per-vertex operations and/or primitive setup operations on one or more vertices in order to generate primitive data for rasterization stage 36. Each vertex may be associated with a set of attributes, such as, e.g., positional coordinates, color values, a normal vector, and texture coordinates. Geometry processing stage 34 modifies one or more of these attributes according to various per-vertex operations. For example, geometry processing stage 34 may perform one or more transformations on vertex positional coordinates to produce modified vertex positional coordinates. Geometry processing stage 34 may, for example, apply one or more of a modeling transformation, a viewing transformation, a projection transformation, a ModelView transformation, a ModelViewProjection transformation, a viewport transformation and a depth range scaling transformation to the vertex positional coordinates to generate the modified vertex positional coordinates. In some instances, the vertex positional coordinates may be model space coordinates, and the modified vertex positional coordinates may be screen space coordinates. The screen space coordinates may be obtained after the application of the modeling, viewing, projection and viewport transformations. In some instances, geometry processing stage 34 may also perform per-vertex lighting operations on the vertices to generate modified color coordinates for the vertices. Geometry processing stage 34 may also perform other operations including, e.g., normal transformations, normal normalization operations, view volume clipping, homogenous division and/or backface culling operations.

Geometry processing stage 34 may produce primitive data that includes a set of one or more modified vertices that define a primitive to be rasterized as well as data that specifies how the vertices combine to form a primitive. Each of the modified vertices may include, for example, modified vertex positional coordinates and processed vertex attribute values associated with the vertex. The primitive data may collectively correspond to a primitive to be rasterized by further stages of graphics processing pipeline 30. Conceptually, each vertex may correspond to a corner of a primitive where two edges of the primitive meet. Geometry processing stage 34 may provide the primitive data to rasterization stage 36 for further processing.

In some examples, all or part of geometry processing stage 34 may be implemented by one or more shader programs executing on one or more shader units. For example, geometry processing stage 34 may be implemented, in such examples, by a vertex shader, a geometry shader or any combination thereof. In other examples, geometry processing stage 34 may be implemented as a fixed-function hardware processing pipeline or as a combination of fixed-function hardware and one or more shader programs executing on one or more shader units.

Rasterization stage 36 is configured to receive, from geometry processing stage 34, primitive data that represents a primitive to be rasterized, and to rasterize the primitive to generate a plurality of source pixels that correspond to the rasterized primitive. In some examples, rasterization stage 36 may determine which screen pixel locations are covered by the primitive to be rasterized, and generate a source pixel for each screen pixel location determined to be covered by the primitive. Rasterization stage 36 may determine which screen pixel locations are covered by a primitive by using techniques such as, e.g., an edge-walking technique, evaluating edge equations, or the like. Rasterization stage 36 may provide the resulting source pixels to pixel processing pipeline 38 for further processing.

The source pixels generated by rasterization stage 36 may correspond to a screen pixel location, e.g., a destination pixel, and be associated with one or more color attributes. All of the source pixels generated for a specific rasterized primitive may be said to be associated with the rasterized primitive. The pixels that are determined by rasterization stage 36 to be covered by a primitive may conceptually include pixels that represent the vertices of the primitive, pixels that represent the edges of the primitive and pixels that represent the interior of the primitive.

Pixel processing pipeline 38 is configured to receive a source pixel associated with a rasterized primitive, and to perform one or more per-pixel operations on the source pixel. Per-pixel operations that may be performed by pixel processing pipeline 38 include, e.g., alpha test, texture mapping, color computation, pixel shading, per-pixel lighting, fog processing, blending, a pixel ownership test, a source alpha test, a stencil test, a depth test, a scissors test and/or stippling operations. In addition, pixel processing pipeline 38 may execute one or more pixel shader programs to perform one or more per-pixel operations. The resulting data produced by pixel processing pipeline 38 may be referred to herein as destination pixel data and stored in output buffer 16. The destination pixel data may be associated with a destination pixel in output buffer 16 that has the same display location as the source pixel that was processed. The destination pixel data may include data such as, e.g., color values, destination alpha values, depth values, etc.

Pixel processing pipeline 38 may include texture engine 39. Texture engine 39 may include both programmable and fixed function hardware designed to apply textures (texels) to pixels. Texture engine 39 may include dedicated hardware for performing texture filtering, whereby one or more texel values are multiplied by one or more pixel values and accumulated to produce the final texture mapped pixel.

Figure 3:
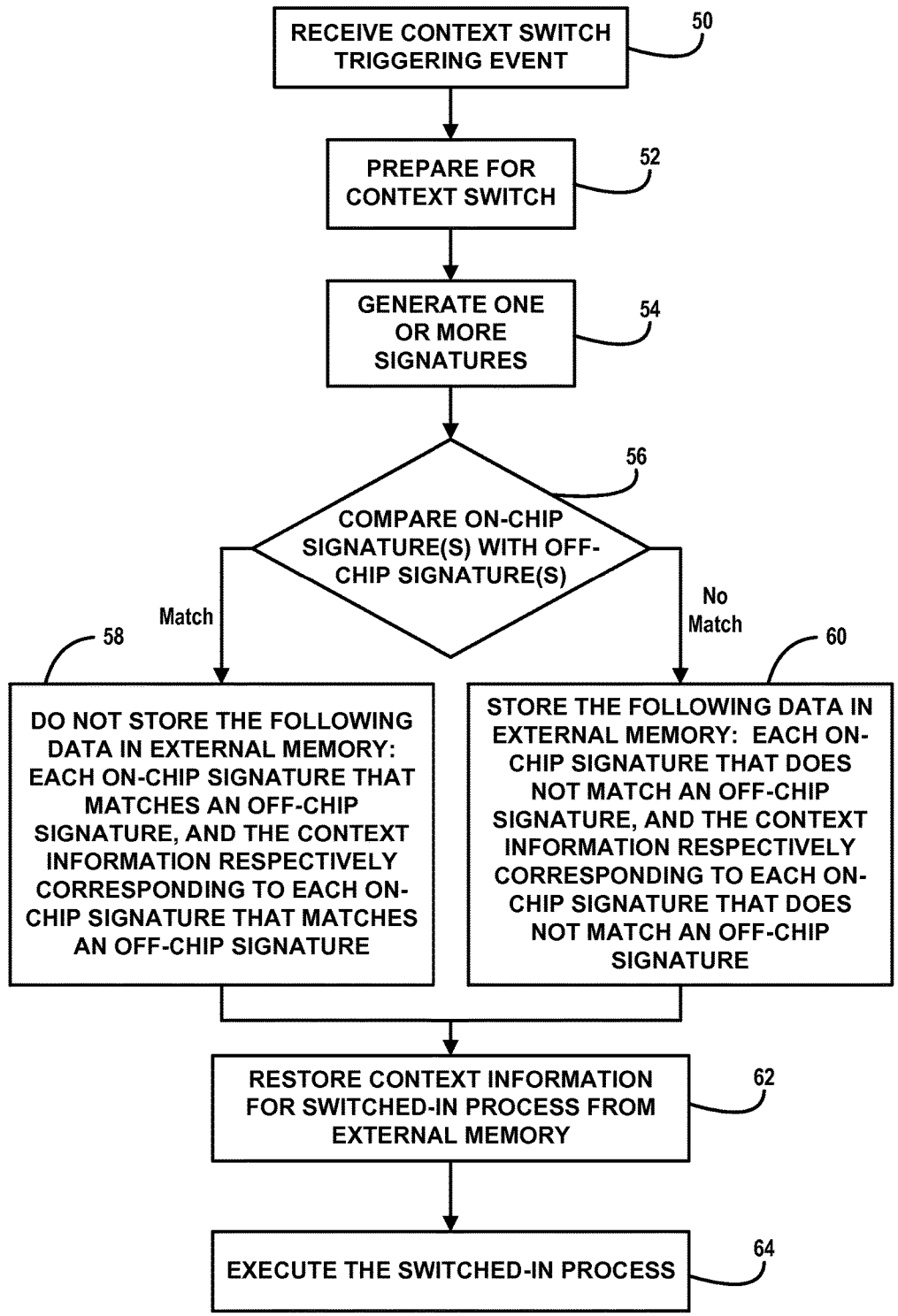
FIG. 3 is a flowchart showing an example method consistent with techniques of this disclosure.

FIG. 3 is a flowchart showing an example method of the disclosure. The method of FIG. 3 may be carried out by CPU 6 or GPU 12. FIG. 3 depicts a method of context switching by a processing unit (e.g., CPU 6 or GPU 12). The processing unit may be configured to receive a context switch triggering event (50). At the time the triggering event is received, the processing unit may be executing one or more processes. In some examples, a context switch triggering event may be triggered by or be received from, for example, a scheduler (e.g., a scheduling processor or a scheduling unit) in a multitasking environment, an interrupt handler for handling one or more interrupts, or a mode controller for controlling a transition between modes (e.g., when switching over from kernel mode to user mode). In such examples, the triggering event may itself be a process schedule event, an interrupt, a request to transition from one mode to another mode, or any instruction relating to a triggering event causing the processing unit to prepare for a context switch, and ultimately perform a context switch. In some examples, a context switch may be triggered asynchronously from workload submission. For example, while a processing unit (e.g., GPU 12) may be working on something (e.g., a task or a process), the processing unit may provide a scheduler (e.g., scheduling processor or scheduling unit) with an interrupt or similar mechanism configured to preempt or otherwise interrupt what the processing unit is working on (e.g., a task or a process). In some examples, the processing unit may be configured to pause or otherwise stop execution of the first process before applying one or more signature algorithms to the context information corresponding to a switched-out process (e.g., the first process in this example). In other examples, the processing unit may be configured to apply one or more signature algorithms to the context information corresponding to a switched-out process (e.g., the first process in this example) before pausing or otherwise stopping execution of the process.

In response to receiving the context switch triggering event, the processing unit may be configured to prepare for a context switch (52) ultimately resulting in the processing unit context switching from a first process (e.g., the switched-out process) to a second process (e.g., the switched-in process). To do so, the processing unit may be configured to generate (54) one or more signatures corresponding to context information stored in on-chip memory of the processing unit. In some examples, the context information may correspond to the first process (e.g., the switched-out process). In some examples, a hardware unit of the processing unit may be configured to generate the one or more signatures. In such examples, the hardware unit of the processing unit may be configured to perform one or more of the functions identified in FIGS. 3, 4, and/or 5. For example, the hardware unit of the processing unit may be configured to perform one or more of the functions associated with blocks 52, 54, 56, 58, 60, 62, 64, 70, and 72.

In some examples, the processing unit (e.g., GPU 12) may be configured to generate the one or more signatures (54) by applying a signature algorithm to the context information. A signature algorithm may result in an MD5 hash value, a cyclic redundancy check (CRC) value, a bloom filter signature value, or other identifier output by a hashing, signature, or filter function. For example, in an example involving an MD5 hash, the processing unit may be configured to apply an MD5 hash algorithm one or more times to context information corresponding to a process (e.g., a switched-out process) to generate one or more corresponding signature(s) (e.g., one or more MD5 hash values in this example). For example, the processing unit may be configured to apply an MD5 hash algorithm to context information as a whole resulting in a single MD5 hash value being generated. As another example, the processing unit may be configured to apply an MD5 hash algorithm to one or more groups and/or one or more types of context information resulting in a respective MD5 hash value for each group and/or type of context information to which the hashing algorithm was applied. In some examples, a signature may be implemented as a multiple input signature register (MISR). For example, a multiple input signature register (MISR) may generate a signature based on one or more bits. For example, a MISR may generate a signature based on one or more bits passing through a hardware module, such as the processing unit or a hardware module of the processing unit.

In some examples, the processing unit may be configured to apply a signature algorithm to binary data stored in on-chip memory of the processing unit. For example, the processing unit may be configured to apply a signature algorithm to data stored in the registers of the processing unit, memory (e.g., RAM) of the processing unit, and/or any other data structure or memory location of the processing unit.

A single signature may be generated for each application of a signature algorithm. For example, if two signatures are generated for the context information, that means that two signature algorithms were applied to two different sets of context information. In this example, the two signature algorithms may be the same or different, and the two different sets of context information corresponding to the same process may or may not have any overlap.

As described herein, context information may be grouped into different types of context information. The groups may be based on context information type and/or how the context information was generated. For example, control register information, constant information, and other software programmed stated information may each be an individual group of context information or may fall within the same group of context information (e.g., software programmed state information). As another example, status flag information, dirty bit information, and other hardware modified state information may each be an individual group of context information or may fall within the same group of context information (e.g., hardware modified state information). As another example, general purpose register information, on-chip memory information, and other hardware generated state information may each be an individual group of context information or may fall within the same group of context information (e.g., hardware generated state information).

In some examples, the processing unit may be configured to apply a signature algorithm to context information as a whole. In other examples, the processing unit may be configured to apply a signature algorithm to each type or group of context information instead of the context information as a whole. In such examples, it may be recognized that certain types or groups of context information may change more frequently than other types or groups of context information. The processing unit may be configured to track each type or group of context information for changes by applying a signature algorithm to generate a signature for each type or group of context information. While increasing the computational cost for generating and comparing signatures, this increase in computational cost is offset in such examples because the processing unit may more efficiently reduce the number of saves and/or restores across multiple context switches. As used herein, reducing the number of saves and/or restores may also refer to reducing the amount of data being saved and/or the amount of data being restored.

The processing unit may be configured to determine whether any of the generated one or more signatures match any previously generated signatures (56). It is understood that previously generated signatures were generated using the same process described above with respect to block 54, except at a time prior to the time at which the one or more signatures were generated. In some examples, previously generated signatures may be referred to as off-chip signatures to indicate that these signatures are stored in memory external to the processing unit, such as external memory 10. In some examples, on-chip memory of the processing unit may include or otherwise be volatile and memory external to the processing unit may include or otherwise be non-volatile memory. In such examples, currently generated signatures may be referred to as on-chip signatures to help distinguish between signatures previously stored on external memory and just-generated signatures stored on the processing unit's on-chip memory for comparison purposes. For example, using this nomenclature, the processing unit may be configured to determine whether any of the one or more on-chip signatures match any off-chip signature.

In other examples, one or more previously generated signatures may be stored in on-chip memory of the processing unit. In this regard, while some examples throughout this disclosure refer to comparing on-chip signatures to off-chip signatures, it is understood that if the particular example is implemented, then such portions of this disclosure may refer to comparing currently generated on-chip signatures to previously generated on-chip signatures. In such examples, currently generated on-chip signatures are analogous to on-chip signatures, and previously generated on-chip signatures are analogous to off-chip signatures with the exception that the previously generated signatures are actually stored in on-chip memory of the processor instead of being stored in external memory.

For each on-chip signature that matches an off-chip signature, the processing unit is configured to not store the following data in external memory: each on-chip signature that matched an off-chip signature, and the context information respectively corresponding to each on-chip signature that matched an off-chip signature (58). If an on-chip signature matches an off-chip signature (i.e., the two signatures are the same), the processing unit does not save the on-chip signature and the context information corresponding to the on-chip signature (i.e., the context information from which the on-chip signature was derived) to external memory because the fact that the signatures match indicates that the context information corresponding to the on-chip signature has not changed from the last time the processing unit stored the corresponding context information in external memory. By avoiding redundantly storing previously stored information, a processing unit (e.g., GPU 12) configured in accordance with an example of the present disclosure may enable faster context switching by decreasing latency, and also may enable a reduction in power and energy consumed. Latency is reduced because generating a signature and performing a signature comparison takes less time to perform than saving context information corresponding to the matched signature.

It is understood that block 58 shows what is not being stored. In some examples, the processing unit may include instructions to this effect. For example, block 58 may be synonymous with skipping or avoiding a saving operation. In other examples, in the event of an on-chip signature matching an off-chip signature match, block 56 may proceed directly to block 62. In such examples, by proceeding directly to block 62, block 60 is skipped or avoided resulting in the on-chip signature and context information corresponding to the on-chip signature not being saved due to block 60 not being invoked or processed.

For each on-chip signature that does not match an off-chip signature, the processing unit is configured to store the following data in external memory: each on-chip signature, and the context information respectively corresponding to each on-chip signature that does not match an off-chip signature (60). In some examples, each respective on-chip signature is saved in a data structure that associates each respective on-chip signature with the corresponding context information from which each respective on-chip signature was derived (or generated). For example, the data structure may include pointers to identify which memory locations in external memory corresponding to which on-chip memory signature. If an on-chip signature does not match an off-chip signature (i.e., the on-chip signature is not the same as any off-chip signature), the processing unit saves the on-chip signature and the context information corresponding to the on-chip signature (i.e., the context information from which the on-chip signature was derived) to external memory because the fact that the on-chip memory does not match any off-chip signature indicates that the context information corresponding to the on-chip signature has changed from the last time the processing unit stored the corresponding context information in external memory. By avoiding redundantly storing previously stored information and instead storing context information when it changes compared to a previous save, the present disclosure enables faster context switching by decreasing latency, and also enables a reduction in power and energy consumed.

The processing unit may be configured to proceed from block 58 and block 60 to restore context information for the switched-in process from external memory (e.g., external memory 10) (62). Following restoration of the context information for the switched-in process, the processing unit may be configured to execute the switched-in process (64). In other examples, the processing unit may return to block 56 from blocks 58 and 62 until each on-chip signature has been resolved (e.g., whether the processing unit has determined whether each on-chip signature matches or does not match an off-chip signature and/or whether blocks 72 and 62 have resolved each instance of a match or a non-match). Once the processing unit has resolved each on-chip signature (or the minimum amount necessary to start executing the switched-in process) generated at block 56, then the processing unit may be configured to proceed to execute the switched-in process (64).

Figure 4:
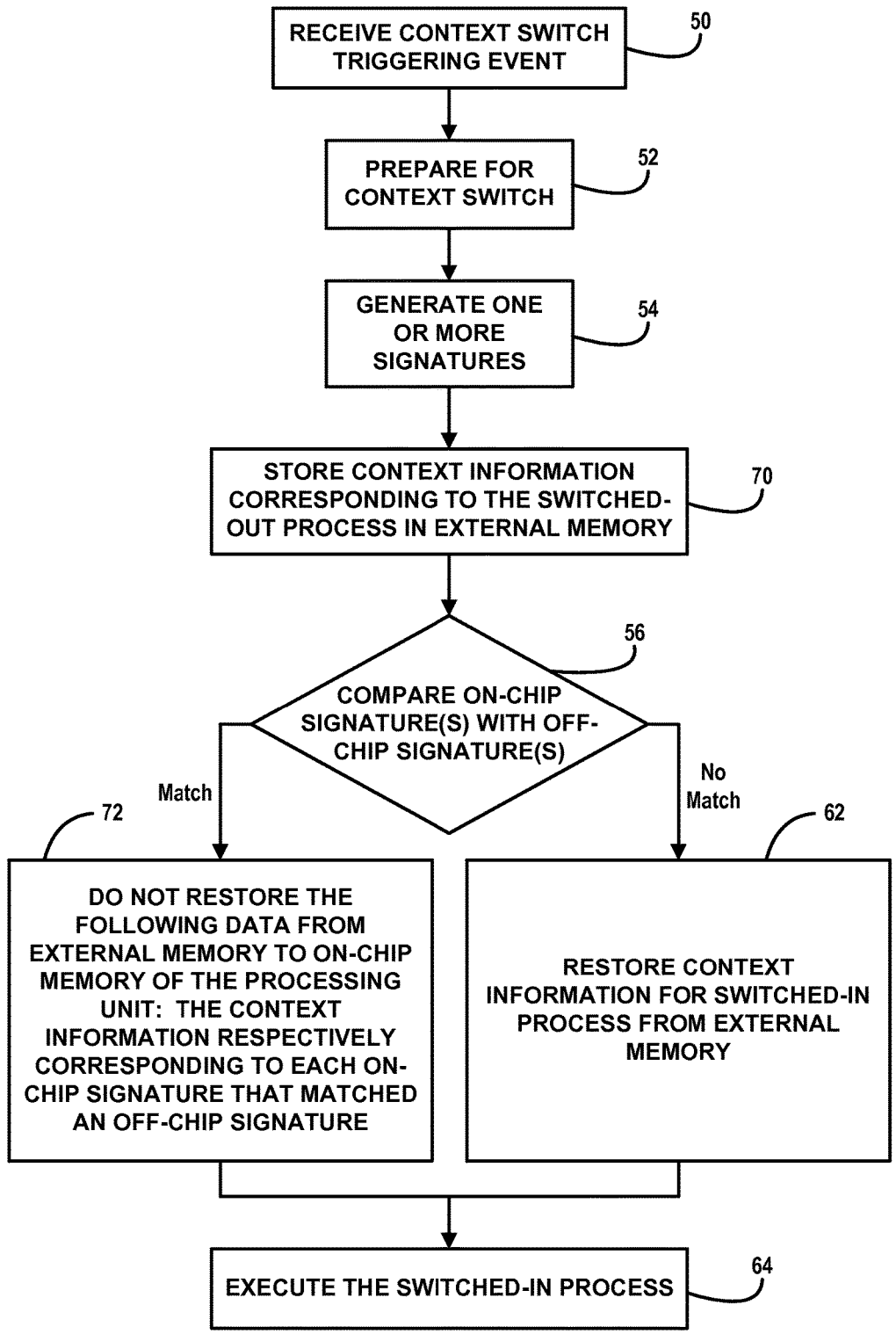
FIG. 4 is a flowchart showing an example method of the disclosure consistent with techniques of this disclosure.
Figure 5:
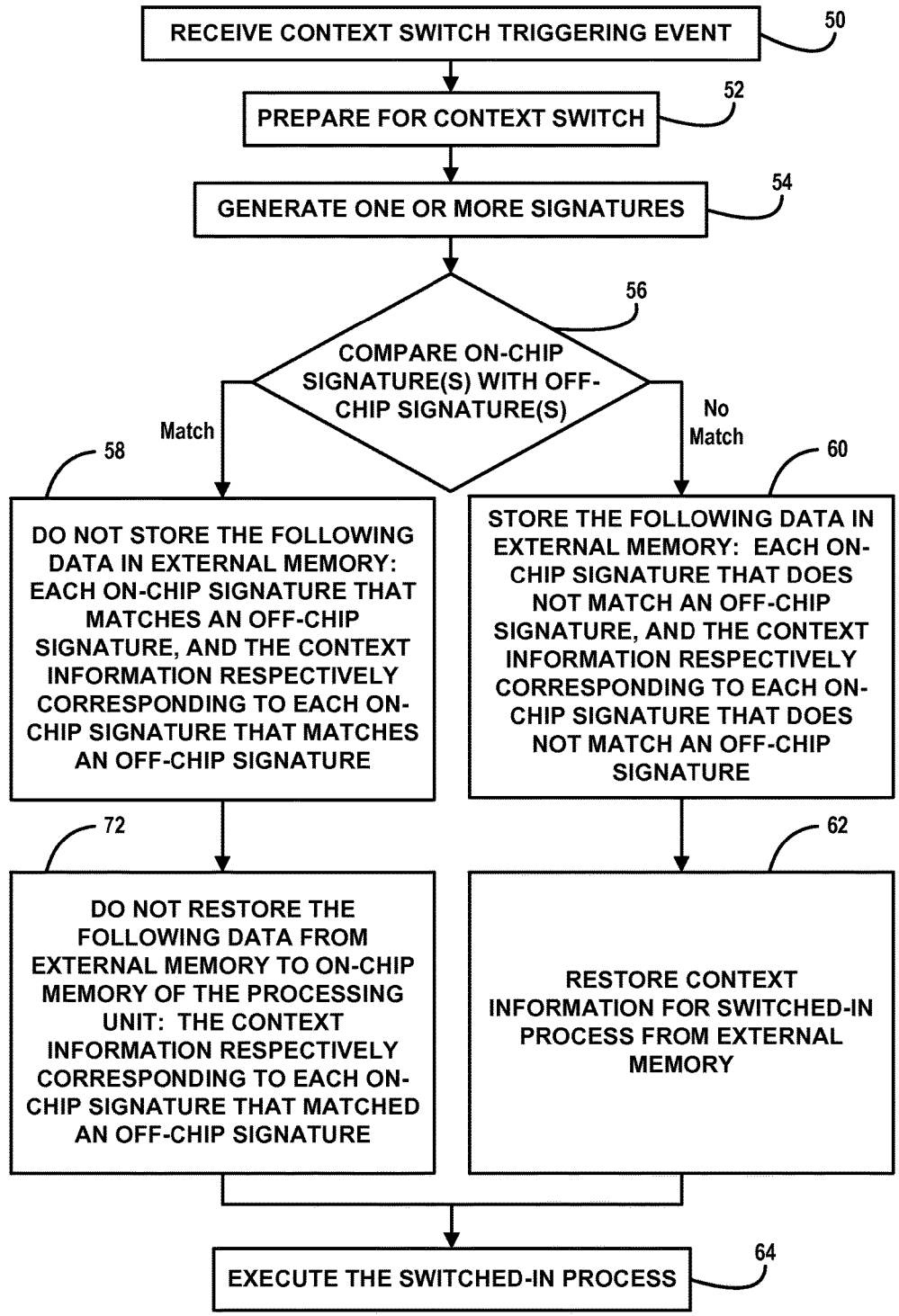
FIG. 5 is a flowchart showing an example method of the disclosure consistent with techniques of this disclosure.

FIG. 4 is a flowchart showing an example method of the disclosure. The method of FIG. 4 may be carried out by CPU 6 or GPU 12. FIG. 4 depicts a method of context switching by a processing unit (e.g., CPU 6 or GPU 12). The processing unit may be configured to receive a context switch triggering event (50) in the same manner as described above with respect to FIG. 3. In response to receiving the context switch triggering event, the processing unit may be configured to prepare for a context switch (52) ultimately resulting in the processing unit context switching from a first process (e.g., the switched-out process) to a second process (e.g., the switched-in process). To do so, the processing unit may be configured to generate one or more signatures (54) corresponding to context information stored in on-chip memory of the processing unit. In the example of FIG. 4, the processing unit may be configured to generate the one or more signatures in the same manner as described above with respect to FIG. 3. The processing unit may be configured to store context information corresponding to the switch-out process in external memory (70). It is understood that the order of operations shown in FIGS. 3-5 is exemplary and may be different in other examples. For example, the processing unit may be configured to store context information corresponding to the switch-out process in external memory (70) before generating one or more signatures (54) corresponding to context information stored in on-chip memory of the processing unit. The processing unit may be configured to determine whether any of the generated one or more signatures match any previously generated signatures (56) in the same manner as described above with respect to FIG. 3.

In the example of FIG. 4, for each on-chip signature that matches an off-chip signature, the processing unit is configured to not restore the following data from external memory to on-chip memory of the processing unit: the context information respectively corresponding to each on-chip signature that matched an off-chip signature (72). If an on-chip signature matches an off-chip signature (i.e., the two signatures are the same), the processing unit does not restore the context information corresponding to the on-chip signature (i.e., the context information from which the on-chip signature was derived) from external memory because the fact that the signatures match indicates that the context information corresponding to the on-chip signature has not changed from the last time the processing unit stored the corresponding context information in external memory. For example, matching signatures indicates that any data that would have been restored would be redundant and therefore unnecessary because the context information being overwritten is the same as the context information being restored, as evidenced by the signatures matching one another. By avoiding redundant, unnecessary restoration of data, a processing unit (e.g., GPU 12) in accordance with an example of the present disclosure may enable faster context switching by decreasing latency, and also may enable a reduction in power and energy consumed. Latency is reduced because generating a signature and performing a signature comparison takes less time to perform than restoring context information corresponding to the matched signature.

It is understood that block 72 shows what is not being restored from external memory to on-chip memory of the processing unit. In some examples, the processing unit may include instructions to this effect. For example, block 72 may be synonymous with skipping or avoiding a restoring operation. In other examples, in the event of an on-chip signature matching an off-chip signature match, block 56 may proceed directly to block 64. In such examples, by proceeding directly to block 64, block 72 is skipped or avoided, resulting in the context information corresponding to the on-chip signature not being restored due to block 72 not being invoked or processed.

For each on-chip signature that does not match an off-chip signature, the processing unit is configured to restore context information for the switched-in process from external memory (e.g., external memory 10) (62). By avoiding redundant, unnecessary restoration of data, the present disclosure enables faster context switching by decreasing latency, and also enables a reduction in power and energy consumed. The processing unit may be configured to proceed from block 72 and block 62 to execute the switched-in process (64). In other examples, the processing unit may return to block 56 from blocks 72 and 62 until each on-chip signature has been resolved (e.g., whether the processing unit has determined whether each on-chip signature matches or does not match an off-chip signature and/or whether blocks 72 and 62 have resolved each instance of a match or a non-match). Once the processing unit has resolved each on-chip signature (or the minimum amount necessary to start executing the switched-in process) generated at block 56, then the processing unit may be configured to proceed to execute the switched-in process (64).

FIG. 5 is a flowchart showing an example method of the disclosure. The method of FIG. 3 and the method of FIG. 4 may be combined in various ways, and FIG. 5 shows one example of such a combination. The method of FIG. 5 may be carried out by CPU 6 or GPU 12. FIG. 5 depicts a method of context switching by a processing unit (e.g., CPU 6 or GPU 12). The processing unit may be configured to receive a context switch triggering event (50) in the same manner as described above with respect to FIG. 3 and FIG. 4. In response to receiving the context switch triggering event, the processing unit may be configured to prepare for a context switch (52) ultimately resulting in the processing unit context switching from a first process (e.g., the switched-out process) to a second process (e.g., the switched-in process). To do so, the processing unit may be configured to generate one or more signatures (54) corresponding to context information stored in on-chip memory of the processing unit. The processing unit may be configured to generate the one or more signatures in the same manner as described above with respect to FIG. 3.

The processing unit may be configured to determine whether any of the generated one or more signatures match any previously generated signatures (56) in the same manner as described above with respect to FIG. 3 and FIG. 4.

For each on-chip signature that matches an off-chip signature, the processing unit is configured to not store the following data in external memory in the same manner as described with respect to FIG. 3: each on-chip signature that matched an off-chip signature, and the context information respectively corresponding to each on-chip signature that matched an off-chip signature (58). In some examples, the processing unit may be configured to return to block 56 from blocks 58 and 60 until each on-chip signature has been resolved for blocks 58 and 60. Once the processing unit has resolved each on-chip signature at blocks 58 and 60, then the processing unit may be configured to proceed to blocks 72 and 62. In other examples, the processing unit may be configured to address all instances of non-matching signatures before addressing any and all instances of matching signatures to ensure that any data that needs to be stored to external memory is not overwritten by a restoration of context information. Otherwise stated, the processing unit described herein may be configured to save any context information from on-chip memory of the processing unit to an external memory before restoring any context information from external memory to the on-chip memory of the processing unit. In such examples, the processing unit may be configured to return to block 56 from blocks 72 and 62 until each on-chip signature has been resolved for blocks 72 and 62. Once the processing unit has resolved each on-chip signature at blocks 72 and 62, then the processing unit may be configured to execute the switched-in process (64).

With further reference to FIG. 5, for each on-chip signature that matches an off-chip signature, the processing unit is configured to not restore the following data from external memory to on-chip memory of the processing unit in the same manner as described with respect to FIG. 4: the context information respectively corresponding to each on-chip signature that matched an off-chip signature (72).

For each on-chip signature that does not match an off-chip signature, in FIG. 5, the processing unit is configured to store the following data in external memory in the same manner as described with respect to FIG. 3: each on-chip signature, and the context information respectively corresponding to each on-chip signature that does not match an off-chip signature (60). For each on-chip signature that does not match an off-chip signature, the processing unit is configured to restore context information for the switched-in process from external memory (62) in the same manner as described with respect to FIG. 4. The processing unit may be configured to proceed from block 72 and block 62 to execute the switched-in process (64), as shown in FIG. 5. In other examples, the processing unit may return to block 56 from blocks 72 and 62 until each on-chip signature has been resolved (e.g., whether the processing unit has determined whether each on-chip signature matches or does not match an off-chip signature). Once the processing unit has resolved each on-chip signature generated at block 56, then the processing unit may be configured to execute the switched-in process (64).

Figure 6:
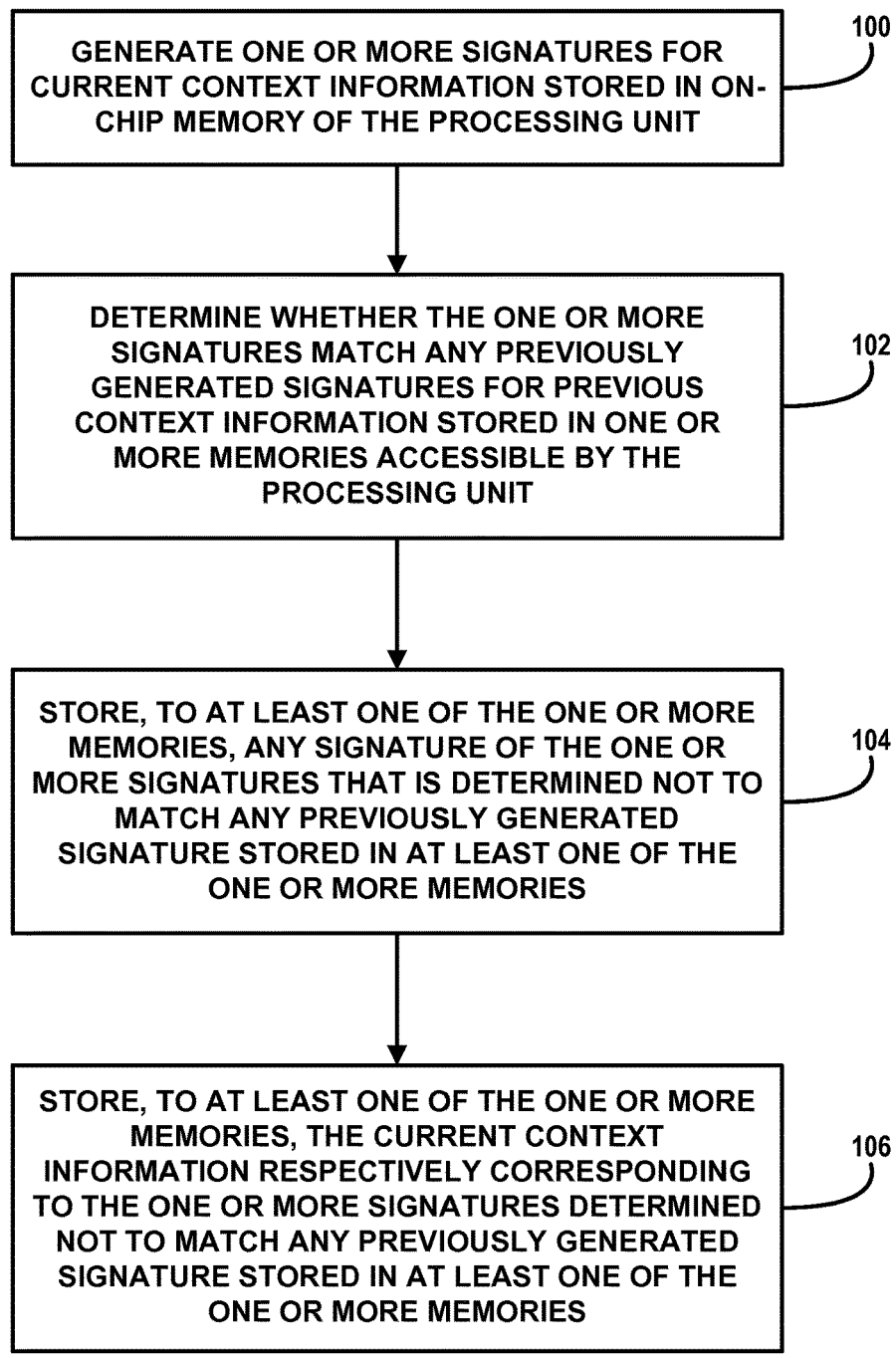
FIG. 6 is a flowchart showing an example method of the disclosure consistent with techniques of this disclosure.

FIG. 6 is a flowchart showing an example method of the disclosure. The method of FIG. 6 may be carried out by a processing unit, such as CPU 6 or GPU 12. FIG. 6 depicts a method of context switching by a processing unit (e.g., CPU 6 or GPU 12). The processing unit may be configured to generate one or more signatures for current context information stored in on-chip memory of the processing unit (100). The processing unit may be configured to determine whether the one or more signatures match any previously generated signatures for previous context information stored in one or more memories accessible by the processing unit (102). Any signature generated for context information may correspond to the context information for which the signature was generated. For example, if Signature A is generated for context information A and Signature B was previously generated for context information B, then Signatures A and B respectively correspond to context information A and B in this example. In some examples, the one or more memories accessible by the processing unit may include at least one of the following: the on-chip memory of the processing unit and a memory external to the processing unit (e.g., system memory 10, on-chip memory of GPU 12 if the processing unit is CPU 6, or on-chip memory of CPU 6 if the processing unit is GPU 12). In some examples, the one or more memories accessible by the processing unit may only include the memory external to the processing unit. In other examples, the one or more memories accessible by the processing unit may only include the memory external to the processing unit where the memory external to the processing unit is a system memory. In other examples, the one or more memories accessible by the processing unit may not include the on-chip memory of the graphics processing unit.

In some examples, current context information may correspond to a preempted process (e.g., switched-out process). For example, current context information may correspond to any context information corresponding to a process executing on the processing unit. As another example, current context information may correspond to any context information corresponding to a process for which execution was paused for a second process but has yet to be swapped out for the second process (e.g., switched-in process). In some examples, previous context information may correspond to one or more previously preempted processes (e.g., one or more previously switched-out processes). For example, previous context information may correspond to any context information corresponding to any process that previously underwent a context switch.

The processing unit may be configured to store, to at least one of the one or more memories, any signature of the one or more signatures that is determined not to match any previously generated signature stored in at least one of the one or more memories (104). The processing unit may be configured to store, to at least one of the one or more memories, the current context information respectively corresponding to the one or more signatures determined not to match any previously generated signature stored in at least one of the one or more memories (106).

In the example of FIG. 6, according to some examples, the one or more memories accessible by the processing unit include the on-chip memory of the processing unit. In other examples, the one or more memories accessible by the graphics processing unit include the memory external to the graphics processing unit. In some examples, the memory external to the processing unit is a system memory. In other examples, the one or more memories accessible by the processing unit only include the on-chip memory of the processing unit. In other examples, the one or more memories accessible by the graphics processing unit only include the memory external to the graphics processing unit.

In the example of FIG. 6, according to some examples, the processing unit may be configured to not store, to any memory, any signature of the one or more signatures that is determined to match any previously generated signature stored in at least one of the one or more memories. The processing unit may be configured to not store, to any memory, the current context information respectively corresponding to the one or more signatures determined to match any previously generated signature stored in at least one of the one or more memories. The processing unit may be configured to not restore previous context information, from the external memory to the on-chip memory, respectively corresponding to any signature of the one or more signatures that is determined to match any previously generated signature stored in at least one of the one or more memories. In some examples, the processing unit may be configured to restore previous context information, from the external memory to the on-chip memory, respectively corresponding to any signature of the one or more signatures that is determined to not match any previously generated signature stored in at least one of the one or more memories.

In the example of FIG. 6, the processing unit may be configured to generate one or more signatures for current context information by being configured to apply one or more signature algorithms to one or more of the following: the current context information, one or more groups of the current context information, one or more types of the current context information. In some examples, the processing unit may be configured to determine whether the one or more signatures match any previously generated signatures by being configured to determine that each of the one or more signatures match any of the previously generated signatures, or that each of the one or more signatures do not match any of the previously generated signatures. In other examples, the processing unit may be configured to determine whether the one or more signatures match any previously generated signatures by being configured to determine that at least one of the one or more signatures match any of the previously generated signatures, and that at least one of the one or more signatures do not match any of the previously generated signatures.

Figure 7:
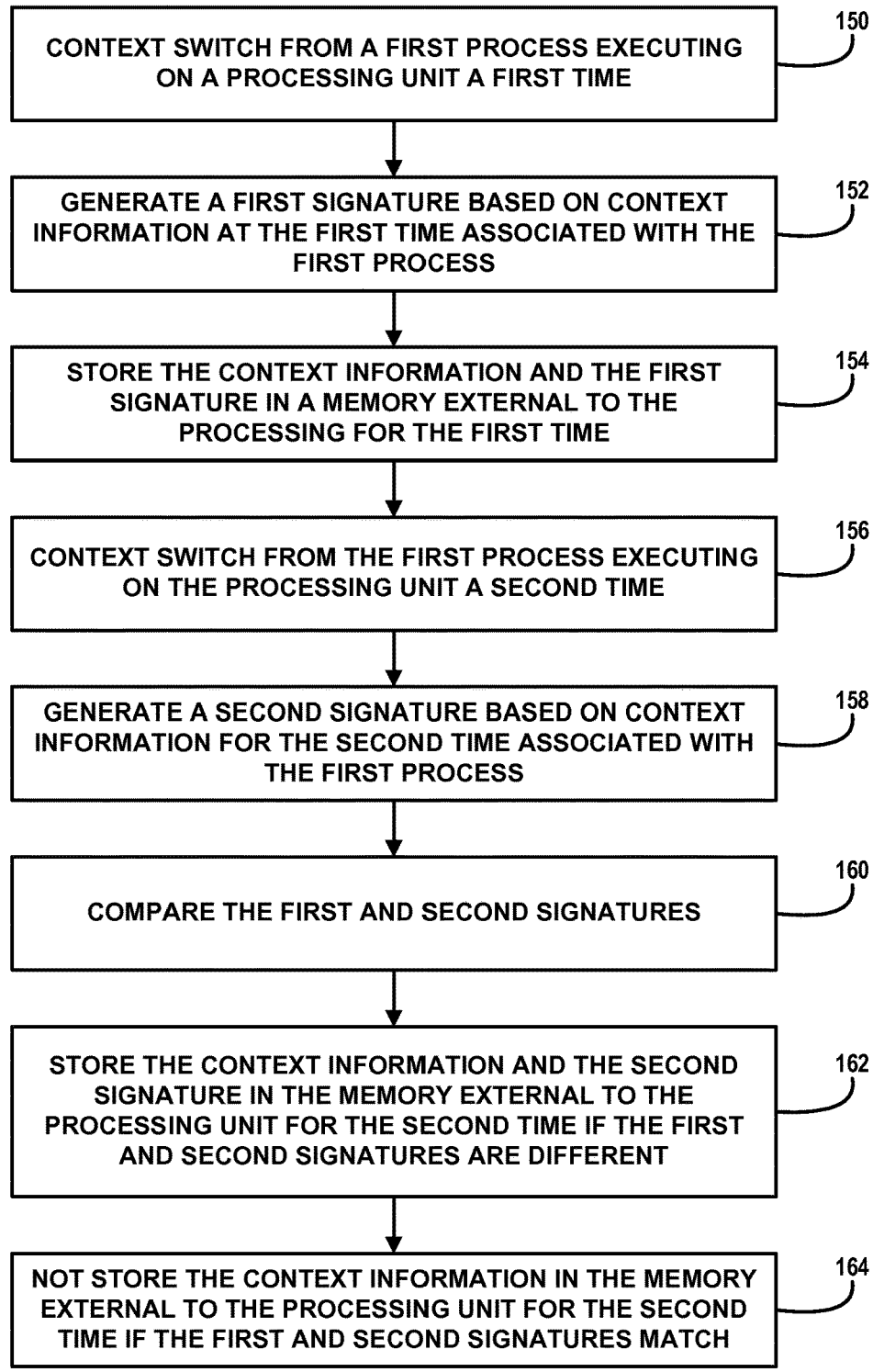
FIG. 7 is a flowchart showing an example method of the disclosure consistent with techniques of this disclosure.

FIG. 7 is a flowchart showing an example method of the disclosure. The method of FIG. 7 may be carried out by CPU 6 or GPU 12. FIG. 7 depicts a method of context switching by a processing unit (e.g., CPU 6 or GPU 12). The processing unit may be configured to context switch from a first process executing on a processing unit a first time (150). The processing unit may be configured to generate a first signature based on context information at the first time associated with the first process (152). The processing unit may be configured to store the context information and the first signature in a memory external to the processing for the first time (154). The processing unit may be configured to context switch from the first process executing on the processing unit a second time (156). The processing unit may be configured to generate a second signature based on context information for the second time associated with the first process (158). The processing unit may be configured to compare the first and second signatures (160). The processing unit may be configured to store the context information and the second signature in the memory external to the processing unit for the second time if the first and second signatures are different (162). The processing unit may be configured to not store the context information in the memory external to the processing unit for the second time if the first and second signatures match (164).

Figure 8:
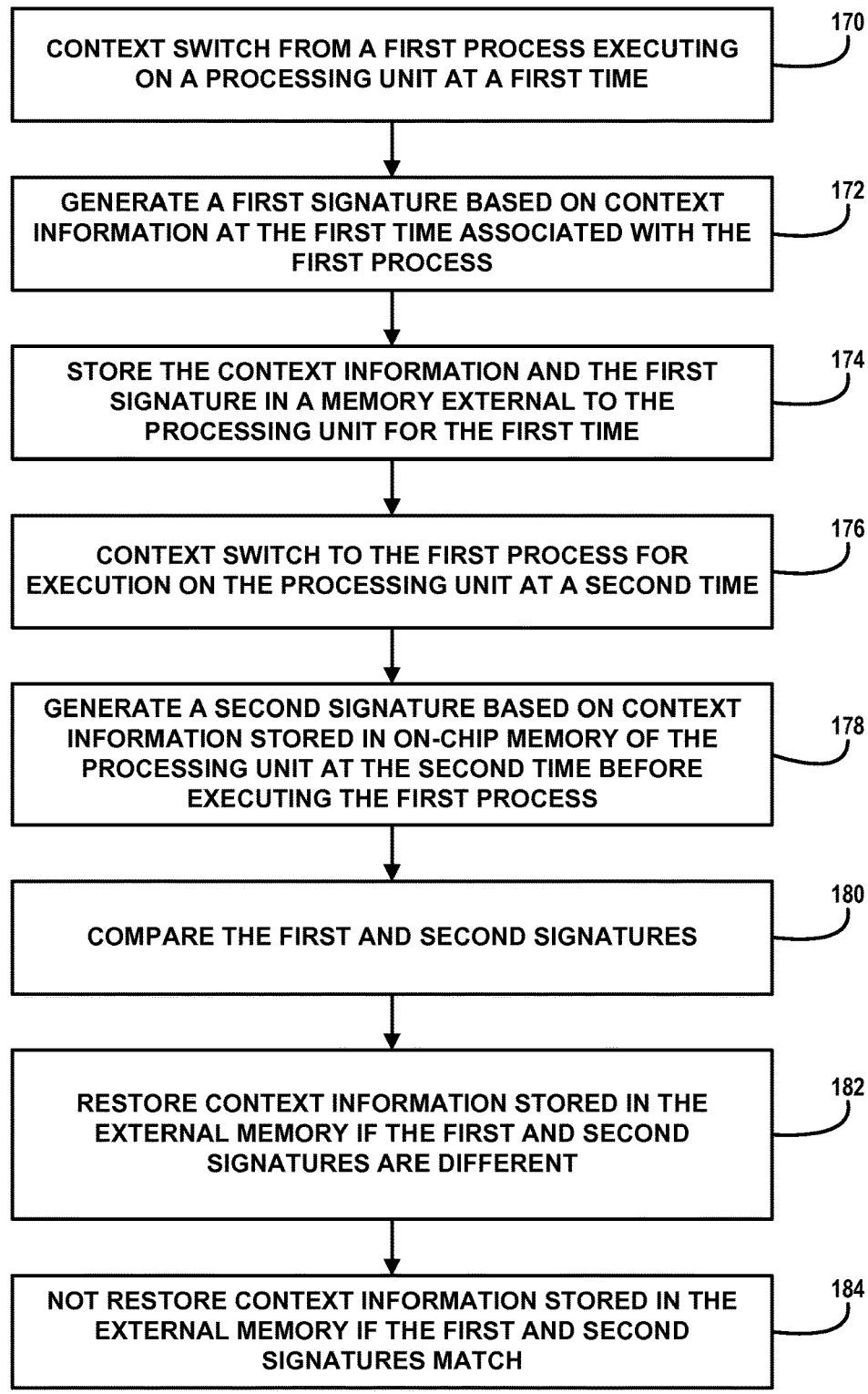
FIG. 8 is a flowchart showing an example method of the disclosure consistent with techniques of this disclosure.

FIG. 8 is a flowchart showing an example method of the disclosure. The method of FIG. 8 may be carried out by CPU 6 or GPU 12. FIG. 8 depicts a method of context switching by a processing unit (e.g., CPU 6 or GPU 12). The processing unit may be configured to context switch from a first process executing on a processing unit at a first time (170). The processing unit may be configured to generate a first signature based on context information at the first time associated with the first process (172). The processing unit may be configured to store the context information and the first signature in a memory external to the processing unit for the first time (174). The processing unit may be configured to context switch to the first process for execution on the processing unit at a second time (176). The processing unit may be configured to generate a second signature based on context information stored in on-chip memory of the processing unit at the second time before executing the first process (178). The processing unit may be configured to compare the first and second signatures (180). The processing unit may be configured to restore context information stored in the external memory if the first and second signatures are different (182). The processing unit may be configured to not restore context information stored in the external memory if the first and second signatures match (184).

Figure 9:
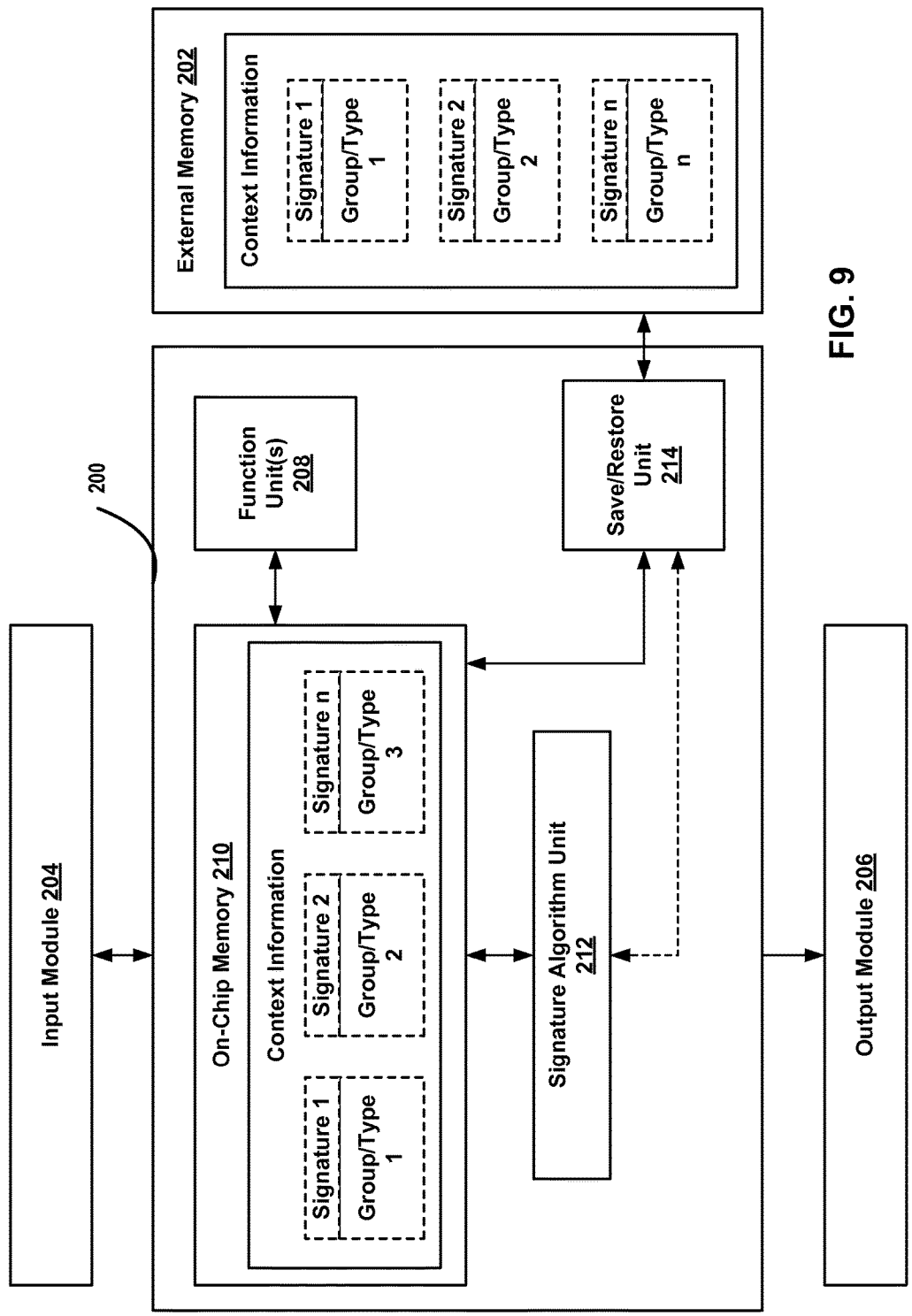
FIG. 9 is a block diagram showing example components of a computing device configured to use the techniques of this disclosure.

FIG. 9 is a block diagram showing one example of a processing unit described herein in accordance with one or more techniques described herein. In the example of FIG. 9, a hardware unit 200 is communicatively coupled to an external memory 202 (e.g., off-chip memory). In some examples, hardware unit 200 may be the entire processing unit or parts of it (e.g., pipeline stages). For example, hardware unit 200 may be GPU 12 or hardware unit 200 may depict components of GPU 12. In some examples, external memory 202 may be any memory external to hardware unit 200. For example, external memory 202 may be system memory 10 as described herein. External memory 202 may store any context information received from hardware unit 200 or any other hardware unit along with any signature(s) associated therewith. External memory 202 and on-chip memory 210 may utilize any data structure to associate any signature(s) with any context information. The context information may or may not be categorized as one or more groups of context information, and/or as one or more types of context information. In the example shown, "Group/Type n" refers to the nth group and/or type. It is understood that groups and types are different despite being labeled as "Group/Type" in the example shown in FIG. 9. Rather, this nomenclature is intended to convey that the context information may be categorized as one or more groups and/or as one or more types.

In the example shown, hardware unit 200 is also communicatively coupled to an input module 204 and an output module 206. In some examples, input module 204 may be any software executing on hardware, firmware, or any hardware that may be configured to convert API state (e.g., how and what to draw) to a format that hardware unit 200 may be configured to process or otherwise understand. In some examples, output module 206 may be any software executing on hardware, firmware, or any hardware that may be configured to receive context information and/or data from the current stage of a processing pipeline (e.g., a graphics pipeline) to the next stage in a processing pipeline.

Hardware unit 200 may include one or more function units 208. A function unit may be anything inside hardware unit 200 or any pipeline stages of hardware unit 200 configured to process data in a way that the context information specifies. For example, an arithmetic logic unit (ALU) may be a function unit that may add two integers based on the precision requirements specified in the context information. As another example, a function unit may receive context information, which may be considered to have rules specifying how a function unit is to process data. As another example, a function unit may receive data as input, process it according to context information, and output the processed data to hardware unit 200 or the next stage in the pipeline. The one or more function units 208 may or may not interact with any generated signature.

In the example shown, hardware unit 200 may include on-chip memory 210, which may store any context information. Hardware unit 200 may include signature algorithm unit 212, which may be configured to apply one or more signature algorithms to any context information to generate one or more signatures. Hardware unit 200 may include save/restore unit 214.

In the example shown, the context information is shown in three exemplary groups or types of context information. In other examples, the context information in on-chip memory 210 may be categorized into one or more groups and/or one or more types of context information. It is understood that groups and types are different despite being labeled as "Group/Type" in the example shown in FIG. 9. Rather, this nomenclature is intended to convey that the context information may be categorized as one or more groups and/or as one or more types. In other examples, context information may not be grouped or may not be referred to as different types. For example, signature algorithm unit 212 may be configured to apply one or more signatures to context information as a whole, as opposed to one or more groups of context information and/or one or more types of context information. Upon applying a signature algorithm to context information, signature algorithm unit may store the generated signature in the on-chip memory of hardware unit 200. In other examples, signature algorithm unit 212 may communicate any generated signatures directly to save/restore unit 214 in addition to or in lieu of storing any generated signatures in on-chip memory 210.

In some examples, hardware unit 200 may be configured to generate one or more signatures for control registers as the control registers are programmed. For example, signature algorithm unit 212 may be configured to generate one or more signatures for control registers as the control registers are programmed.

In some examples, save/restore unit 214 may be any software executing on hardware, firmware, or any hardware. In some examples, save/restore unit 214 may be configured to compare whether any signature generated by signature algorithm unit 212 matches any signature stored in on-chip memory 210 and/or external memory 202 (e.g., any off-chip memory). As described throughout this disclosure, depending on whether a match exists may determine whether save/restore unit 214 stores (or does not store) context information to external memory 202 and/or restores (or does not restore) context information to on-chip memory 210 from external memory 202.

In accordance with this disclosure, the term "or" may be interpreted as "and/or" where context does not dictate otherwise. Additionally, while phrases such as "one or more" or "at least one" or the like may have been used for some features disclosed herein but not others; the features for which such language was not used may be interpreted to have such a meaning implied where context does not dictate otherwise.

In one or more examples, the functions described herein may be implemented in hardware, software, firmware, or any combination thereof. For example, processing unit may be configured to perform any function described herein. As another example, although the term "processing unit" has been used throughout this disclosure, it is understood that such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" or "processing unit" as used herein may refer to any of the foregoing structure or any other structure suitable for implementation of the techniques described herein. In addition, in some aspects, the functionality described herein may be provided within dedicated hardware and/or software modules configured for context switching and/or parallel processing. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for context switching by a graphics processing unit, the method comprising:
    receiving a context switch triggering event to context switch from a switched-out process to a switched-in process;
    applying a signature algorithm to current context information stored in on-chip memory of the graphics processing unit to generate a plurality of signatures for the current context information, wherein the signature algorithm comprises one or more of a hash algorithm, a cyclic redundancy check (CRC) algorithm, or a bloom filter signature algorithm, and the plurality of signatures comprise one or more of a hash value, a CRC value, or a bloom filter signature value;

determining that a first subset of the plurality of signatures do not match any previously generated signature for previous context information stored in one or more off-chip memories accessible by the graphics processing unit, wherein the first subset of the plurality of signatures corresponds to a first subset of context information of the current context information;

determining that a second subset of the plurality of signatures match one or more of the previously generated signatures for the previous context information stored in the one or more off-chip memories accessible by the graphics processing unit, wherein the second subset of the plurality of signatures corresponds to a second subset of context information of the current context information;

for the first subset of the plurality of signatures:
    storing, to at least one of the one or more off-chip memories, each signature of the first subset of the plurality of signatures that is determined not to match any previously generated signature stored in at least one of the one or more off-chip memories; and
    storing, to at least one of the one or more off-chip memories, the first subset of context information respectively corresponding to the first subset of the plurality of signatures determined not to match any previously generated signature stored in at least one of the one or more off-chip memories;

for the second subset of the plurality of signatures:
    avoid storing each signature of the second subset of the plurality of signatures that is determined to match the one or more of the previously generated signatures stored in at least one of the one or more off-chip memories;

restoring, from the one or more off-chip memories, the first subset of context information respectively corresponding to the first subset of the plurality of signatures;

avoiding restoring, from the one or more off-chip memories, the second subset of context information corresponding to the second subset of the plurality of signatures; and executing the switched-in process.

2. The method of claim 1, wherein the current context information corresponds to a preempted process, and wherein the previous context information corresponds to one or more previously preempted processes.

3. The method of claim 1, wherein applying the signature algorithm to generate the plurality of signatures for the current context information comprises applying one or more signature algorithms to one or more of the following: the current context information, one or more groups of the current context information, and one or more types of the current context information.

4. A device comprising:
a graphics processing unit configured to perform context switching, wherein the graphics processing unit has on-chip memory; and
a memory external to the graphics processing unit, wherein the graphics processing unit is configured to:
    receive a context switch triggering event to context switch from a switched-out process to a switched-in process;
    apply a signature algorithm to current context information stored in on-chip memory of the graphics processing unit to generate a plurality of signatures for the current context information, wherein the signature algorithm comprises one or more of a hash algorithm, a cyclic redundancy check (CRC) algorithm, or a bloom filter signature algorithm, and the plurality of signatures comprise one or more of a hash value, a CRC value, or a bloom filter signature value;

determine that a first subset of the plurality of signatures do not match any previously generated signature for previous context information stored in one or more off-chip memories accessible by the graphics processing unit, wherein the first subset of the plurality of signatures corresponds to a first subset of context information of the current context information;

determine that a second subset of the plurality of signatures match one or more of the previously generated signatures for the previous context information stored in the one or more off-chip memories accessible by the graphics processing unit, wherein the second subset of the plurality of signatures corresponds to a second subset of context information of the current context information;

for the first subset of the plurality of signatures:
        store, to at least one of the one or more off-chip memories, each signature of the first subset of the plurality of signatures that is determined not to match any previously generated signature stored in at least one of the one or more off-chip memories; and
        store, to at least one of the one or more off-chip memories, the first subset of context information respectively corresponding to the first subset of the plurality of signatures determined not to match any previously generated signature stored in at least one of the one or more off-chip memories;

for the second subset of the plurality of signatures:
        avoid storing each signature of the second subset of the plurality of signatures that is determined to match any the one or more of the previously generated signatures stored in at least one of the one or more off-chip memories;

restore, from the one or more off-chip memories, the first subset of context information respectively corresponding to the first subset of the plurality of signatures;

avoid restoring, from the one or more off-chip memories, the second subset of context information corresponding to the second subset of the plurality of signatures; and execute the switched-in process.

5. The device of claim 4, wherein the current context information corresponds to a preempted process, and wherein the previous context information corresponds to one or more previously preempted processes.

6. The device of claim 4, wherein to apply the signature algorithm to generate the plurality of signatures for the current context information, the graphics processing unit is configured to apply one or more signature algorithms to one or more of the following: the current context information, one or more groups of the current context information, and one or more types of the current context information.

7. An apparatus comprising a graphics processing unit, the graphics processing unit comprising:
means for receiving a context switch triggering event to context switch from a switched-out process to a switched-in process;

means for applying a signature algorithm to current context information stored in on-chip memory of the graphics processing unit to generate a plurality of signatures for the current context information, wherein the signature algorithm comprises one or more of a hash algorithm, a cyclic redundancy check (CRC) algorithm, or a bloom filter signature algorithm, and the plurality of signatures comprise one or more of a hash value, a CRC value, or a bloom filter signature value;

means for determining that a first subset of the plurality of signatures do not match any previously generated signature for previous context information stored in one or more off-chip memories accessible by the graphics processing unit, wherein the first subset of the plurality of signatures corresponds to a first subset of context information of the current context information;

means for determining that a second subset of the plurality of signatures match one or more of the previously generated signatures for the previous context information stored in the one or more off-chip memories accessible by the apparatus, wherein the second subset of the plurality of signatures corresponds to a second subset of context information of the current context information;

for the first subset of the plurality of signatures:
  means for storing, to at least one of the one or more off-chip memories, each signature of the first subset of the plurality of signatures that is determined not to match any previously generated signature stored in at least one of the one or more off-chip memories; and
  means for storing, to at least one of the one or more off-chip memories, the first subset of context information respectively corresponding to the first subset of the plurality of signatures determined not to match any previously generated signature stored in at least one of the one or more off-chip memories;

for the second subset of the plurality of signatures:
  means for avoiding storing each signature of the second subset of the plurality of signatures that is determined to match the one or more of the previously generated signatures stored in at least one of the one or more off-chip memories;

means for restoring, from the one or more off-chip memories, the first subset of context information respectively corresponding to the first subset of the plurality of signatures;

means for avoiding restoring, from the one or more off-chip memories, the second subset of context information corresponding to the second subset of the plurality of signatures; and means for executing the switched-in process.

8. The apparatus of claim 7, wherein the means for applying the signature algorithm to generate the plurality of signatures for the current context information comprises means for applying one or more signature algorithms to one or more of the following: the current context information, one or more groups of the current context information, and one or more types of the current context information.

9. A non-transitory computer-readable storage medium having instructions stored thereon that, when executed, cause one or more processors of a computing device to:
  receive a context switch triggering event to context switch from a switched-out process to a switched-in process;
  apply a signature algorithm to current context information stored in on-chip memory of the graphics processing unit to generate a plurality of signatures for the current context information, wherein the signature algorithm comprises one or more of a hash algorithm, a cyclic redundancy check (CRC) algorithm, or a bloom filter signature algorithm, and the plurality of signatures comprise one or more of a hash value, a CRC value, or a bloom filter signature value;
  determine that a first subset of the plurality of signatures do not match any previously generated signature for previous context information stored in one or more off-chip memories accessible by the graphics processing unit, wherein the first subset of the plurality of signatures corresponds to a first subset of context information of the current context information;
  determine that a second subset of the plurality of signatures match one or more of the previously generated signatures for the previous context information stored in the one or more off-chip memories accessible by the graphics processing unit, wherein the second subset of the plurality of signatures corresponds to a second subset of context information of the current context information;
  for the first subset of the plurality of signatures:
    store, to at least one of the one or more off-chip memories, each signature of the first subset of the plurality of signatures that is determined not to match any previously generated signature stored in at least one of the one or more off-chip memories; and
    store, to at least one of the one or more off-chip memories, the first subset of context information respectively corresponding to the first subset of the plurality of signatures determined not to match any previously generated signature stored in at least one of the one or more off-chip memories;
  for the second subset of the plurality of signatures:
    avoid storing each signature of the second subset of the plurality of signatures that is determined to match the one or more of the previously generated signatures stored in at least one of the one or more off-chip memories;
  restore, from the one or more off-chip memories, the first subset of context information respectively corresponding to the first subset of the plurality of signatures;
  avoid restoring, from the one or more off-chip memories, the second subset of context information corresponding to the second subset of the plurality of signatures; and
  execute the switched-in process.

* * * * *